United States Patent
Kanno et al.

(10) Patent No.: US 10,897,059 B2
(45) Date of Patent: Jan. 19, 2021

(54) SULFIDE SOLID ELECTROLYTE MATERIAL, BATTERY, AND PRODUCING METHOD FOR SULFIDE SOLID ELECTROLYTE MATERIAL

(71) Applicants: TOKYO INSTITUTE OF TECHNOLOGY, Tokyo-to (JP); TOYOTA JIDOSHA KABUSHIKI KAISHA, Toyota (JP)

(72) Inventors: Ryoji Kanno, Yokohama (JP); Satoshi Hori, Machida (JP); Yuki Kato, Gotemba (JP)

(73) Assignees: TOKYO INSTITUTE OF TECHNOLOGY, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 15/735,355

(22) PCT Filed: Jul. 1, 2016

(86) PCT No.: PCT/JP2016/069713
§ 371 (c)(1),
(2) Date: Dec. 11, 2017

(87) PCT Pub. No.: WO2017/002971
PCT Pub. Date: Jan. 5, 2017

(65) Prior Publication Data
US 2018/0175447 A1    Jun. 21, 2018

(30) Foreign Application Priority Data
Jul. 2, 2015 (JP) ................. 2015-133747

(51) Int. Cl.
*H01M 10/0562* (2010.01)
*H01M 10/052* (2010.01)
(Continued)

(52) U.S. Cl.
CPC ......... *H01M 10/0562* (2013.01); *C01B 33/32* (2013.01); *H01B 1/10* (2013.01);
(Continued)

(58) Field of Classification Search
None
See application file for complete search history.

(56) References Cited

U.S. PATENT DOCUMENTS

2014/0363745 A1    12/2014  Hirayama et al.
2015/0037687 A1*    2/2015  Kanno .................. H01B 1/10
                                                                429/319
(Continued)

FOREIGN PATENT DOCUMENTS

JP      2013-149599 A    8/2013
JP      2013177288 A     9/2013
(Continued)

OTHER PUBLICATIONS

Sep. 27, 2016 International Search Report issued within International Patent Application No. PCT/JP2016/069713.

*Primary Examiner* — Eli S Mekhlin
(74) *Attorney, Agent, or Firm* — Oliff PLC

(57) ABSTRACT

The problem of the present invention is to provide a sulfide solid electrolyte material with favorable reduction resistance. The present invention solves the problem by providing a sulfide solid electrolyte material having a peak at a position of 2θ=30.26°±1.00° in X-ray diffraction measurement using a CuKα ray, and having a composition of $Li_{(4-x-4y)}Si_{(1-x+y)}P_{(x)}S_{(4-2a-z)}O_{(2a+z)}$ (a=1−x+y, 0.65≤x≤0.75, −0.025≤y≤0.1, −0.2≤z≤0).

18 Claims, 11 Drawing Sheets

Octahedron O (Such as $LiS_{6-x}O_x$)
Tetrahedron $T_1$ (Such as $SiS_{4-x}O_x$ and $PS_{4-x}O_x$)
Tetrahedron $T_2$ (Such as $PS_{4-x}O_x$)

(51) Int. Cl.
    *H01B 1/10*           (2006.01)
    *C01B 33/32*        (2006.01)
    *H01M 10/0525*    (2010.01)
    *H01M 10/0585*    (2010.01)

(52) U.S. Cl.
    CPC ..... *H01M 10/052* (2013.01); *H01M 10/0525* (2013.01); *H01M 10/0585* (2013.01); *C01P 2002/72* (2013.01); *C01P 2002/77* (2013.01); *C01P 2006/40* (2013.01); *H01M 2300/0068* (2013.01)

(56) References Cited

U.S. PATENT DOCUMENTS

2015/0372345 A1    12/2015   Kato et al.
2017/0155168 A1     6/2017   Kanno et al.

FOREIGN PATENT DOCUMENTS

| | | |
|---|---|---|
| JP | 2014-135216 A | 7/2014 |
| JP | 2016-027545 A | 2/2016 |
| WO | 2014/109191 A1 | 7/2014 |

\* cited by examiner $Li_{(4-x-4y)}Si_{(1-x+y)}P_{(x)}S_{(4-2a-z)}O_{(2a+z)}$,  $a=1-x+y$ $Li_{(4-x-4y)}Si_{(1-x+y)}P_{(x)}S_{(4-2a-z)}O_{(2a+z)}$, $a=1-x+y$ $Li_{(4-x-4y)}Si_{(1-x+y)}P_{(x)}S_{(4-2a-z)}O_{(2a+z)}$,  $a=1-x+y$

SULFIDE SOLID ELECTROLYTE MATERIAL, BATTERY, AND PRODUCING METHOD FOR SULFIDE SOLID ELECTROLYTE MATERIAL

TECHNICAL FIELD

The present invention relates to a sulfide solid electrolyte material with favorable reduction resistance.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that a safety device for restraining temperature rise during a short circuit and a structure for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material is known as a solid electrolyte material used for an all solid lithium battery. In Patent Literature 1, for example, a sulfide solid electrolyte material with a specific peak in X-ray diffraction measurement, containing a Li element, a Ge element, a Si element, a P element and a S element, is disclosed. Also, it is disclosed that the inclusion of the Si element in the sulfide solid electrolyte material allows reductive decomposition of the sulfide solid electrolyte material to be restrained.

CITATION LIST

Patent Literature

Patent Literature 1: Japanese Patent Application Laid-Open No. (JP-A) 2013-177288

SUMMARY OF INVENTION

Technical Problem

A sulfide solid electrolyte material such as to allow reductive decomposition to be further restrained is demanded. The present invention has been made in view of the problem, and the main object thereof is to provide a sulfide solid electrolyte material with favorable reduction resistance.

Solution to Problem

To solve the above problem, the present invention provides a sulfide solid electrolyte material having a peak at a position of $2\theta=30.26°\pm1.00°$ in X-ray diffraction measurement using a CuKα ray, and having a composition of $Li_{(4-x-4y)}Si_{(1-x+y)}P_{(x)}S_{(4-2a-z)}O_{(2a-z)}$ ($a=1-x+y$, $0.65\leq x\leq 0.75$, $-0.025\leq y\leq 0.1$, $-0.2\leq z\leq 0$).

The present invention is provided with a crystal phase having a peak in the vicinity of $2\theta=30.26°$ and has a specific composition, so as to allow the sulfide solid electrolyte material with favorable reduction resistance.

Further, the present invention provides a sulfide solid electrolyte material having a peak at a position of $2\theta=30.26°\pm1.00°$ in X-ray diffraction measurement using a CuKα ray, and having a composition of $Li_{(3.14-x)}Si_{(0.34-x)}P_{(0.70+x)}S_{(3.32-z)}O_{(0.68+z)}$ ($-0.13\leq x\leq 0.13$, $-0.11\leq z\leq 0.11$).

The present invention is provided with a crystal phase having a peak in the vicinity of $2\theta=30.26°$ and has a specific composition, so as to allow the sulfide solid electrolyte material with favorable reduction resistance.

Further, the present invention provides a sulfide solid electrolyte material having an octahedron O comprising a Li element and a S element, a tetrahedron $T_1$ comprising at least one element of a P element and a Si element, and a S element, and a tetrahedron $T_2$ comprising at least one element of a P element and a Si element, and a S element, the tetrahedron $T_1$ and the octahedron O sharing an edge, and the tetrahedron $T_2$ and the octahedron O containing a crystal structure sharing a corner, wherein at least one of the octahedron O, the tetrahedron $T_1$ and the tetrahedron $T_2$ is such that part of the S element is substituted with an O element, and the sulfide solid electrolyte material has a composition of $Li_{(4-x-4y)}Si_{(1-x+y)}P_{(x)}S_{(4-2a-z)}O_{(2a+z)}$ ($a=1-x+y$, $0.65\leq x\leq 0.75$, $-0.025\leq y\leq 0.1$, $-0.2\leq z\leq 0$).

According to the present invention, the octahedron O, the tetrahedron $T_1$ and the tetrahedron $T_2$ have a predetermined crystal structure (a three-dimensional structure) and the sulfide solid electrolyte material has a specific composition, so as to allow the sulfide solid electrolyte material with favorable reduction resistance.

Further, the present invention provides a sulfide solid electrolyte material having an octahedron O comprising a Li element and a S element, a tetrahedron $T_1$ comprising at least one element of a P element and a Si element, and a S element, and a tetrahedron $T_2$ comprising at least one element of a P element and a Si element, and a S element, the tetrahedron $T_1$ and the octahedron O sharing an edge, and the tetrahedron $T_2$ and the octahedron O containing a crystal structure sharing a corner, wherein at least one of the octahedron O the tetrahedron $T_1$ and the tetrahedron $T_2$ is such that part of the S element is substituted with an O element, and the sulfide solid electrolyte material has a composition of $Li_{(3.14-x)}Si_{(0.34-x)}P_{(0.70+x)}S_{(3.32-z)}O_{(0.68+z)}$ ($-0.13\leq x\leq 0.13$, $-0.11\leq z\leq 0.11$).

According to the present invention, the octahedron O the tetrahedron $T_1$ and the tetrahedron $T_2$ have a predetermined crystal structure (a three-dimensional structure) and the sulfide solid electrolyte material has a specific composition, so as to allow the sulfide solid electrolyte material with favorable reduction resistance.

Further, the present invention provides a battery comprising a cathode active material layer containing a cathode active material, an anode active material, layer containing an anode active material, and an electrolyte layer formed between the cathode active material layer and the anode active material layer, wherein at least one of the cathode active material layer, the anode active material layer and the electrolyte layer contains the above-described sulfide solid electrolyte material.

According to the present invention, the use of the sulfide solid electrolyte material described above allows the battery with high reduction resistance.

Further, the present invention provides a producing method for the above-described sulfide solid electrolyte material, comprising steps of: a mechanical milling step of obtaining a precursor material by performing mechanical milling for a raw material composition containing a constituent of the sulfide solid electrolyte material; and a melting and quenching step of melting by heating and quenching the precursor material to obtain the sulfide solid electrolyte material.

According to the present invention, the performance of the mechanical milling step and the melting and quenching step allows the sulfide solid electrolyte material with favorable reduction resistance to be obtained.

In the above invention, a heating temperature in the melting and quenching step is preferably within a range of 800° C. to 1100° C.

Advantageous Effects of Invention

The present invention produces the effect such as to allow a sulfide solid electrolyte material with favorable reduction resistance to be obtained.

BRIEF DESCRIPTION OF DRAWINGS

FIGS. 12A to 12C are results of charge and discharge tests for evaluation batteries using a sulfide solid electrolyte material obtained in Example 1 and Comparative Examples 4 to 6.

DESCRIPTION OF EMBODIMENTS

Figure 1:
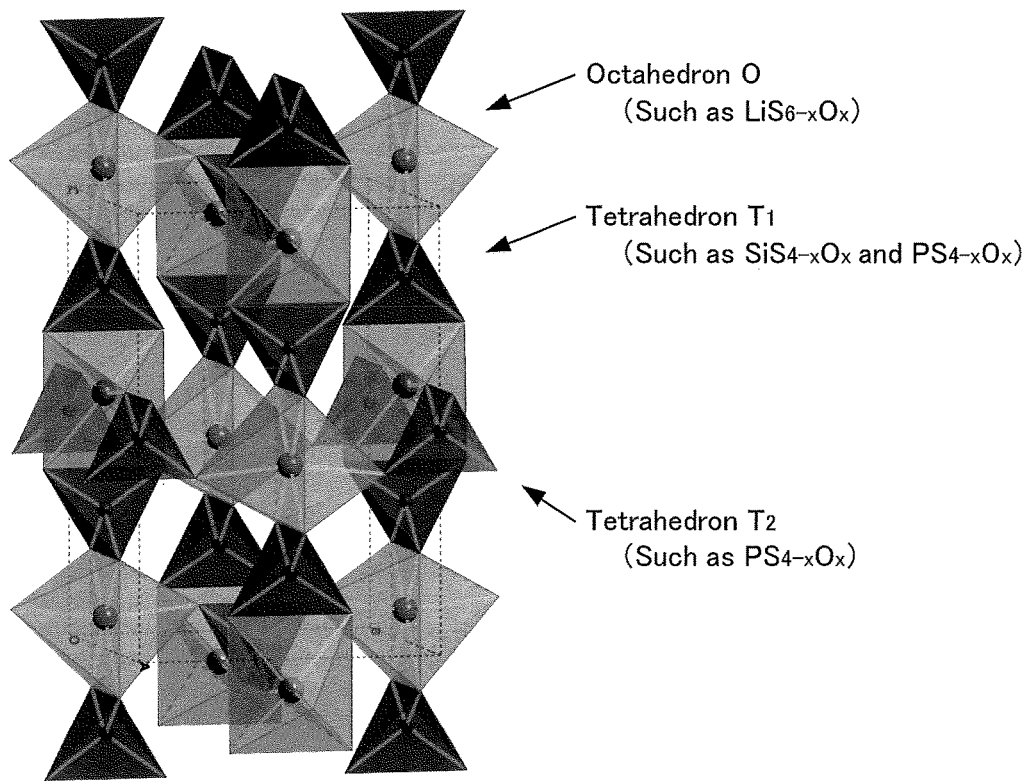
FIG. 1 is a perspective view explaining an example of a crystal structure of a sulfide solid electrolyte material of the present invention.

A sulfide solid electrolyte material, a battery and a producing method for a sulfide solid electrolyte material of the present invention are hereinafter described in detail.

A. Sulfide Solid Electrolyte Material

First, a sulfide solid electrolyte material of the present invention is described. The sulfide solid electrolyte material of the present invention may be roughly divided into some embodiments. Then, the sulfide solid electrolyte material of the present invention is described while divided into each embodiment.

1. First Embodiment

A sulfide solid electrolyte material of a first embodiment has a peak at a position of $2\theta=30.26°\pm1.00°$ in X-ray diffraction measurement using a CuKα ray, and has a composition of $Li_{(3.14-x)}Si_{(0.34-x)}P_{(0.70+x)}S_{(3.32-z)}O_{(0.68+z)}$ ($-0.13 \le x \le 0.13$, $-0.11 \le z \le 0.11$).

The first embodiment is provided with a crystal phase having a peak in the vicinity of $2\theta=30.26°$ and has a specific composition so as to allow the sulfide solid electrolyte material with favorable reduction resistance. The reason why the reduction resistance is improved is presumed to be that a Si—O bond is formed in a crystal structure by introduced oxygen. The Si—O bond is electrochemically stable as compared with an M-S bond (M=Ge, Si and Sn) for example. Accordingly, it is presumed that reduction resistance of the sulfide solid electrolyte material is improved. Also, as described later, the composition of $Li_{3.14}Si_{0.34}P_{0.70}S_{3.32}O_{0.68}$ is such that a molar ratio between tetravalent and pentavalent cations (Si and P) and anions (S and O) is 1.04:4, and differs in molar ratio between cations and anions from conventionally known LGPS (such as $Li_{3.35}Ge_{0.35}P_{0.65}S_4$, cations anions=4:1). Thus, it is presumed that a part of Li (Li not contributing to ion conduction) for forming a framework structure in the crystal structure may be substituted with Si. It is presumed that a crystal lattice contracts in accordance with this substitution and a sulfur ion with a large ionic radius is substituted with an oxygen ion with a small ionic radius correspondingly to this contraction. Thus, it is presumed that the adjustment of molar ratio between cations and anions allows more oxygen to be introduced into the crystal structure and consequently reduction resistance of the sulfide solid electrolyte material is improved.

Also, with regard to the sulfide solid electrolyte material of the first embodiment, potential window on the reduction side is wide. Thus, for example, in the case the sulfide solid electrolyte material of the first embodiment is used for an anode active material layer or a solid electrolyte layer of a battery, coulomb efficiency may be improved. Also, for example, in the case Li is segregated on the surface of an anode active material, a stable interface may be formed between the segregated Li and the sulfide solid electrolyte material. Also, the sulfide solid electrolyte material of the first embodiment is provided with a crystal phase having a peak in the vicinity of 2θ=30.26°. As described later, this crystal phase is a crystal phase with such high Li ion conductivity as to allow the sulfide solid electrolyte material with favorable Li ion conductivity.

Here, the sulfide solid electrolyte material described in Patent Literature 1 has a crystal structure with high Li ion conductivity. A crystal phase having this crystal structure is regarded as a crystal phase A'. The crystal phase A' ordinarily has peaks at a position of 2θ=12.36°, 14.05°, 14.40°, 17.38°, 20.18°, 20.44°, 23.56°, 23.96°, 24.93°, 26.96°, 29.07°, 29.58°, 31.71°, 32.66° and 33.39°. Incidentally, these peak positions occasionally shift in a range of ±1.00° for the reason that a crystal lattice changes somewhat due to factors such as the material composition.

The sulfide solid electrolyte material of the first embodiment has the crystal phase A similar to the crystal phase A'. The crystal phase A ordinarily has peaks at a position of 2θ=12.66°, 14.28°, 14.81°, 17.74°, 20.64°, 21.03°, 23.96°, 24.63°, 27.66°, 29.91° and 30.26°. Incidentally, these peak positions also possibly shift in a range of ±1.00° and the range is preferably ±0.50°. Incidentally, the crystal phase A' in the sulfide solid electrolyte material described in Patent Literature 1 exhibits high Li ion conductivity in such a manner that Li ions conduct through a space portion of the crystal structure. The crystal phase A in the sulfide solid electrolyte material of the first embodiment also has the similar crystal structure as the crystal phase A', thus exhibits favorable Li ion conductivity.

Also, the sulfide solid electrolyte material described in Patent Literature 1 occasionally has a peak in the vicinity of 2θ=27.33°. A crystal phase B' having this peak is a crystal phase with lower Li ion conductivity than the crystal phase A' described above. Also, the crystal phase B' is ordinarily conceived to have peaks of 2θ=17.46°, 18.12°, 19.99°, 22.73°, 25.72°, 27.33°, 29.16° and 29.78°.

The sulfide solid electrolyte material of the first embodiment possibly has the crystal phase B similar to the crystal phase B'. The crystal phase B is conceived to be in a range of ±1.00° to the peak positions of the crystal phase B'. Incidentally, the crystal phases A and B are both crystal phases exhibiting Li ion conductivity, but the Li ion conductivity differs between the crystal phases, and it is conceived that the crystal phase B has lower Li ion conductivity as compared with the crystal phase A. Thus, the ratio of the crystal phase B is preferably decreased. In the first embodiment, in the case where diffraction intensity at a peak in the vicinity of 2θ=30.26° is regarded as $I_A$ and diffraction intensity at a peak in the vicinity of 2θ=27.33° is regarded as $I_B$, a value of $I_B/I_A$ is, for example, less than 0.50, preferably 0.45 or less, more preferably 0.25 or less, further more preferably 0.15 or less, and particularly preferably 0.07 or less. Also, a value of $I_B/I_A$ is preferably 0. In other words, it is preferable that the sulfide solid electrolyte material of the first embodiment does not have a peak in the vicinity of 2θ=27.33°.

The sulfide solid electrolyte material of the first embodiment ordinarily has a composition of $Li_{(3.14-x)}Si_{(0.34-x)}P_{(0.70+x)}S_{(3.32-z)}O_{(0.68)}$ (−0.13≤x≤0.13, −0.11≤z≤0.11) The value "x" is ordinarily −0.13 or more and may be −0.10 or more. On the other hand, "x" is ordinarily 0.13 or less and may be 0.10 or less. The value "z" is ordinarily −0.11 or more and may be −0.07 or more. On the other hand, "z" is ordinarily 0.11 or less and may be 0.07 or less.

The sulfide solid electrolyte material of the first embodiment is ordinarily a sulfide solid electrolyte material with crystallinity. Also, the sulfide solid electrolyte material of the first embodiment is preferably high in Li ion conductivity, and Li ion conductivity of the sulfide solid electrolyte material at 25° C. is preferably 1.0×10$^{-4}$ S/cm or more. Also, the shape of the sulfide solid electrolyte material of the first embodiment is not particularly limited but examples thereof include a powdery shape. In addition, the average particle diameter of the powdery sulfide solid electrolyte material is preferably within a range of 0.1 μm to 50 μm, for example.

The sulfide solid electrolyte material of the first embodiment may be used for arbitrary uses in which Li ion conductivity is required. Above all, the sulfide solid electrolyte material of the first embodiment is preferably the one which can be used for a battery. Also, a producing method for the sulfide solid electrolyte material of the first embodiment is explained in detail in the later described 'C. Producing method for sulfide solid electrolyte material'. Also, the sulfide solid electrolyte material of the first embodiment may have characteristics of the later described second embodiment together therewith.

2. Second Embodiment

A sulfide solid electrolyte material of a second embodiment has a peak at a position of 2θ=30.26°±1.00° in X-ray diffraction measurement using a CuKα ray, and has a composition of $Li_{(4-x-4y)}Si_{(1-x+y)}P_{(x)}S_{(4-2a-z)}O_{(2a+z)}$ (a=1−x+y, 0.65≤x≤0.75, −0.025≤y≤0.01, −0.2≤z≤0).

The second embodiment is provided with a crystal phase having a peak in the vicinity of 2θ=30.26° and has a specific composition so as to allow the sulfide solid electrolyte material with favorable reduction resistance. Incidentally, the sulfide solid electrolyte material of the second embodiment is the same as the sulfide solid electrolyte material of the first embodiment except that the composition range differs therefrom; thus, the description herein is omitted.

The sulfide solid electrolyte material of the second embodiment usually has a composition of $Li_{(4-x-4y)}Si_{(1-x+y)}P_{(x)}S_{(4-2a-z)}O_{(2a+z)}$ (a=1−x+y, 0.65≤x≤0.75, −0.025≤y≤0.1, −0.2≤z≤0). The composition of $Li_{(4-x-4y)}Si_{(1-x+y)}P_{(x)}S_{(4-2a-z)}O_{(2a+z)}$ may be determined from following points. In other words, many of the sulfide solid electrolyte material having a superionic conductor $Li_{10}GeP_2S_{12}$-type structure (the sulfide solid electrolyte material having the crystal phase A) have been reported on the pseudo two-component system of $Li_4MA_4$-$Li_3PA_4$ (M=Si, Sn, Ge; A=S, O) in the past. The composition on this pseudo two-component system may be represented by $Li_{4-k}M_{1-k}P_kA_4$ ((1−k) $Li_4MA_4$-$Li_3PA_4$→$Li_{4-k}M_{1-k}P_kA_4$). Meanwhile, in the pseudo three-component system of $Li_2S$—$SiO_2$—$P_2S_5$, a composition corresponding to $Li_4MA_4$-$Li_3PA_4$ is $Li_4SiS_2O_2$—$Li_3PS_4$, and the pseudo two-component system may be represented by $Li_{4-x}Si_{1-x}P_xS_{2+2x}O_{2-2x}$. In the pseudo three-component system of $Li_2S$—$SiO_2$—$P_2S_5$, even with the composition slightly shifted from the pseudo two-component system of $Li_4SiS_2O_2$—$Li_3PS_4$, a sulfide solid electrolyte material having a superionic conductor $Li_{10}GeP_2S_{12}$-type structure may be obtained. Then, by using parameter y that represents the composition substitution of $4Li^-$↔$S^{4+}$, to show the shift from the pseudo two-component system of $Li_4SiS_2O_2$—$Li_3PS_4$ connection, it may be represented by $Li_{4-x-4}Si_{1-x+y}P_xS_{2+2x-2y}O_{2-2x+2y}$; furthermore, by using parameter z that represents a ratio of $S^{2-}$↔$O^{2-}$, it may be represented by $Li_{4-x-4y}Si_{1-x+y}P_x$ $S_{2+2x-2y-z}O_{2-2x+2y+z}$. Incidentally, when synthesizing with the composition of z≠0, in addition to the raw materials $Li_2S$, $SiO_2$, and $P_2S_5$, it is preferably to use $P_2O_5$ or $SiS_2$ in combination. Here, to facilitate the view of the composition formula, if "a"=1−x+y, the composition formula of $Li_{(4-x-4y)}Si_{(1-x+y)}P_{(x)}S_{(4-2a-z)}O_{2a+z)}$ may be obtained.

In the composition formula, x is usually, 0.65 or more, and may be 0.57 or more. Meanwhile, x is usually 0.75 or less, and may be 0.73 or less. Usually, y is −0.025 or more, and may be −0.03 or more. Meanwhile, y is usually 0.1 or less, and may be be 0.08 or less. Usually, z is −0.2 or more, and may be −0.15 or more. Meanwhile, z is usually 0 or less, and may be 0.8 or less.

3. Third Embodiment

FIG. 1 is a perspective view explaining an example of a crystal structure of the sulfide solid electrolyte material of the third embodiment. In the crystal structure shown in FIG. 1, the octahedron O has Li as the central element and has six pieces of S (incidentally, a part of S may be substituted with O) at the corner of the octahedron. The octahedron is $LiS_{6-x}O_x$ (0≤x<6) octahedron, for example. The tetrahedron $T_1$ has at least one of Si and P as the central element and has four pieces of S (incidentally, a part of S may be substituted with O) at the corner of the tetrahedron. The tetrahedron $T_1$ is both $SiS_{4-x}O_x$ (0≤x<4) tetrahedron and $PS_{4-x}O_x$ (0≤x<4) tetrahedron, for example. The tetrahedron $T_2$ has at least one of Si and P as the central element and has four pieces of S (incidentally, a part of S may be substituted with O) at the corner of the tetrahedron. The tetrahedron $T_2$ is $PS_{4-x}O_x$ (0≤x<4) tetrahedron, for example.

Also, with regard to the sulfide solid electrolyte material of the third embodiment, at least one of the octahedron O, the tetrahedron $T_1$ and the tetrahedron $T_2$ is such that a part of the S element is substituted with the O element. Incidentally, it may be confirmed by XRD pattern analysis and neutron diffraction through Rietveld method that a part of the S element is substituted with the O element. In addition, the tetrahedron $T_1$ and the octahedron O share an edge, and the tetrahedron $T_2$ and the octahedron O share a corner. Also, the sulfide solid electrolyte material of the third embodiment has the same composition as that of the first embodiment described above.

According to the third embodiment, the octahedron O, the tetrahedron $T_1$ and the tetrahedron $T_2$ have the predetermined crystal structure (a three-dimensional structure) and the sulfide solid electrolyte material has a specific composition, so as to allow the sulfide solid electrolyte material with favorable reduction resistance.

The sulfide solid electrolyte material of the third embodiment is not particularly limited if the sulfide solid electrolyte material has the crystal structure. Also, the sulfide solid electrolyte material of the third embodiment preferably contains the crystal structure as the main body. 'Containing the crystal structure as the main body' signifies that the ratio of the crystal structure is largest with respect to all crystal phases contained in the sulfide solid electrolyte material. The ratio of the crystal structure is, for example, 50 weight % or more, preferably 70 weight % or more, and more preferably 90 weight % or more. Incidentally, the ratio of the crystal structure may be measured by radiated light XRD, for example. In particular, the sulfide solid electrolyte material of the third embodiment is preferably a single-phase material of the crystal structure. Also, the sulfide solid electrolyte material of the third embodiment may have characteristics of the first embodiment or the second embodiment described above together therewith.

4. Fourth Embodiment

The sulfide solid electrolyte material of the fourth embodiment has a specific crystal structure, and has a composition of $Li_{(4-x-4y)}Si_{(1-x+y)}P_{(x)}S_{(4-2a-z)}O_{(2a+z)}$ (a=1−x+y, 0.65≤x≤0.75, −0.025≤y≤0.1, −0.2≤z≤0).

According to the fourth embodiment, the octahedron O, the tetrahedron $T_1$ and the tetrahedron $T_2$ have the predetermined crystal structure (a three-dimensional structure) and the sulfide solid electrolyte material has a specific composition, so as to allow the sulfide solid electrolyte material with favorable reduction resistance. Incidentally, the sulfide solid electrolyte material of the fourth embodiment is the same as the sulfide solid electrolyte material of the third embodiment except that the composition range is different; thus, the description herein is omitted.

B. Battery

Figure 2:
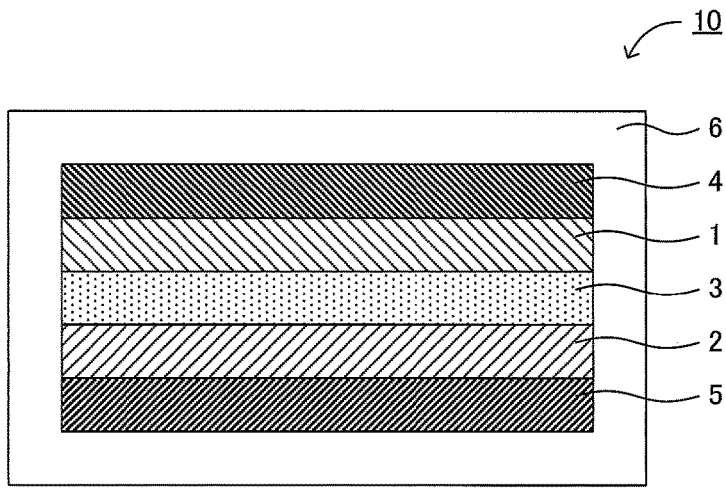
FIG. 2 is a schematic cross-sectional view showing an example of a battery of the present invention.

FIG. 2 is a schematic cross-sectional view showing an example of a battery of the present invention. A battery 10 in FIG. 2 has a cathode active material layer 1 containing a cathode active material, an anode active material layer 2 containing an anode active material, an electrolyte layer 3 formed between the cathode active material layer 1 and the anode active material layer 2, a cathode current collector 4 for collecting currents of the cathode active material layer 1, an anode current collector 5 for collecting currents of the anode active material layer 2, and a battery case 6 for storing these members. The present invention features the configuration in which at least one of the cathode active material layer 1, the anode active material layer 2 and the electrolyte layer 3 contains the sulfide solid electrolyte material described in 'A. Sulfide solid electrolyte material' above.

According to the present invention, the use of the sulfide solid electrolyte material described above allows the battery with high reduction resistance.

The battery of the present invention is hereinafter described in each constitution.

1. Anode Active Material Layer

The anode active material layer in the present invention is a layer containing at least an anode active material, and may contain at least one of a solid electrolyte material, a conductive material and a binder as required.

Examples of the anode active material include a metal active material and a carbon active material. Examples of the metal active material include Li, In, Al, Si and Sn. Also, the metal active material may be a metal simple substance such as Li or an alloy such as a Li alloy. On the other hand, examples of the carbon active material include mesocarbon microbeads (MCMB), highly oriented pyrolytic graphite (HOPG), hard carbon and soft carbon.

In the present invention, the anode active material layer contains a solid electrolyte material, which is preferably the sulfide solid electrolyte material described above. The reason therefor is that the sulfide solid electrolyte material described above is high in reduction resistance. The ratio of the sulfide solid electrolyte material contained in the anode active material layer varies with kinds of a battery and is within a range of 0.1% by volume to 80% by volume for example, above all, within a range of 1% by volume to 60% by volume, and particularly preferably within a range of 10% by volume to 50% by volume.

The anode active material layer may further contain a conductive material. The addition of the conductive material allows conductivity of the anode active material layer to be improved. Examples of the conductive material include acetylene black, Ketjen Black and carbon fiber. Also, the anode active material layer may contain a binder. Examples of kinds of the binder include a fluorine-containing binder such as polyvinylidene fluoride (PVDF). Also, the thickness of the anode active material layer is preferably within a range of 0.1 µm to 1000 µm, for example.

2. Electrolyte Layer

The electrolyte layer in the present invention is a layer formed between the cathode active material layer and the anode active material layer. The electrolyte layer is not particularly limited if the layer allows ion conduction, but is preferably a solid electrolyte layer comprising a solid electrolyte material. The reason therefor is to allow the battery with higher safety as compared with a battery using a liquid electrolyte to be obtained. In addition, in the present invention, a solid electrolyte layer preferably contains the sulfide solid electrolyte material described above. The ratio of the sulfide solid electrolyte material contained in a solid electrolyte layer is within a range of 10% by volume to 100% by volume for example, above all, preferably within a range of 50% by volume to 100% by volume. The thickness of a solid electrolyte layer is preferably within a range of 0.1 µm to 1000 µm, for example, and within a range of 0.1 µm to 300 µm, above all. Also, examples of a method for forming a solid electrolyte layer include a method of compression-molding a solid electrolyte material. Incidentally, the electrolyte layer in the present invention may be a layer comprising an electrolyte liquid.

3. Cathode Active Material Layer

The cathode active material layer in the present invention is a layer containing at least a cathode active material, and may contain at least one of a solid electrolyte material, a conductive material and a binder as required. In particular, in the present invention, the cathode active material layer contains a solid electrolyte material, which is preferably the sulfide solid electrolyte material described above. The ratio of the sulfide solid electrolyte material contained in the cathode active material layer varies with kinds of a battery, but is within a range of 0.1% by volume to 80% by volume for example, above all, within a range of 1% by volume to 60% by volume, and particularly preferably within a range of 10% by volume to 50% by volume. Also, examples of a cathode active material include $LiCoO_2$, $LiMnO_2$, $Li_2NiMn_3O_8$, $LiVO_2$, $LiCrO_2$, $LiFePO_4$, $LiCoPO_4$, $LiNO_2$ and $LiNi_{1/3}Co_{1/3}Mo_{1/3}O_2$. Incidentally, a conductive material and a binder used for the cathode active material layer are the same as the case of the anode active material layer described above. Also, the thickness of the cathode active material layer is preferably within a range of 0.1 µm to 1000 µm, for example.

4. Other Constitutions

The battery of the present invention has at least the anode active material layer, the electrolyte layer and the cathode active material layer described above; ordinarily further has a cathode current collector for collecting currents of the cathode active material layer and an anode current collector for collecting currents of the anode active material layer. Examples of a material for the cathode current collector include SUS, aluminum, nickel, iron, titanium and carbon. On the other hand, examples of a material for the anode current collector include SUS, copper, nickel and carbon. Also, the thickness and the shape of the cathode current collector and the anode current collector are preferably selected properly in accordance with uses of a battery. Also, a battery case of a general battery may be used for a battery case used for the present invention. Examples of the battery case include a battery case made of SUS.

5. Battery

The battery of the present invention may be a primary battery or a secondary battery, preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a producing method for the battery of the present invention is not particularly limited if the method allows the battery described above to be obtained, and the same producing method as that for a general battery may be used. For example, in the case where the battery of the present invention is an all solid state battery, examples of a producing method therefor include a method such that a material comprising a cathode active material layer, a material comprising a solid electrolyte layer and a material comprising an anode active material layer are sequentially pressed to thereby produce a power generating element and this power generating element is stored inside a battery case to be crimped.

C. Producing Method for Sulfide Solid Electrolyte Material

Figure 3:
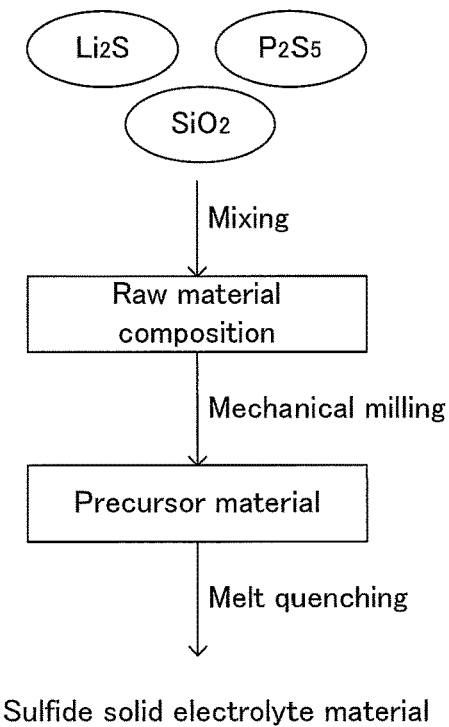
FIG. 3 is an explanatory view showing an example of a producing method for a sulfide solid electrolyte material of the present invention.

FIG. 3 is an explanatory view showing an example of the producing method for a sulfide solid electrolyte material of the present invention. In the producing method for the sulfide solid electrolyte material in FIG. 3, first, a raw material composition is produced by mixing $Li_2S$, $P_2S_5$ and $SiO_2$. On this occasion, in order to prevent the raw material composition from being deteriorated due to moisture in the air, the raw material composition is preferably produced under an inert gas atmosphere Next, a precursor material is obtained by performing mechanical milling for the raw material composition. Next, the precursor material is melted by heating and thereafter quenched. Thus, a sulfide solid electrolyte material is obtained.

According to the present invention, the performance of the mechanical milling step and the melting and quenching step allows the sulfide solid electrolyte material with favorable reduction resistance.

The producing method for the sulfide solid electrolyte material of the present invention is hereinafter described in each step.

1. Mechanical Milling Step

The mechanical milling step in the present invention is a step of obtaining a precursor material by performing mechanical milling for a raw material composition containing a constituent of the sulfide solid electrolyte material. The raw material composition is ground by mechanical milling to improve the uniformity.

The raw material composition in the present invention contains the Li element, the Si element, the P element, the S element and the O element. Examples of a compound containing the Li element include a sulfide of Li. Specific examples of the sulfide of Li include $Li_2S$. Also, examples of a compound containing the Si element include a sulfide of Si. Specific examples of the sulfide of Si include $SiS_2$. Also, examples of a compound containing the P element include a simple substance of P and a sulfide of P. Specific examples of the sulfide of P include $P_2S_5$. A compound containing the S element is not particularly limited and may be a simple substance or a sulfide. Examples of the sulfide include a sulfide containing the element described above. Examples of a compound containing the O element include an oxide such as an oxide of Li, Si or P. Specific examples thereof include $SiO_2$.

Mechanical milling is a method for grinding a test sample while applying mechanical energy thereto. Examples of mechanical milling include vibrating mill, ballmill, turbomill, mechano-fusion and disk mill; among them, vibrating mill is preferable.

The conditions of vibrating mill are not particularly limited if the conditions are such as to allow a desired precursor material to be obtained. The vibration amplitude of vibrating mill is within a range of 5 mm to 15 mm for example, above all, preferably within a range of 6 mm to 10 mm. The vibration frequency of vibrating mill is within a range of 500 rpm to 2000 rpm for example, above all, preferably within a range of 1000 rpm to 1800 rpm. The filling factor of a test sample of vibrating mill is within a range of 1% by volume to 80% by volume for example, above all, within a range of 5% by volume to 60% by volume, particularly preferably within a range of 10% by volume to 50% by volume. The treating time of vibrating mill is not particularly limited. Also, a vibrator (such as a vibrator made of alumina) is preferably used in vibrating mill.

2. Melting and Quenching Step

The melting and quenching step in the present invention is a step of melting the precursor material by heating and then quenching the material so as to obtain the sulfide solid electrolyte material.

In the present invention, at least a part of the precursor material is melted by heating. The heating temperature is, for example, 550° C. or more, preferably 700° C. or more, and more preferably 800° C. or more. Too low heating temperature brings a possibility that the precursor material may not sufficiently be melted (fused). On the other hand, the heating temperature is, for example, 1800° C. or less, preferably 1500° C. or less, and more preferably 1100° C. or less. Too high heating temperature brings a possibility that the precursor material reacts excessively with a reaction vessel (such as a quartz tube).

The heating time is preferably adjusted properly so as to allow a desired sulfide solid electrolyte material to be obtained, and is, for example, within a range of 30 minutes to 10 hours, and preferably within a range of 1 hour to 5 hours. Also, heating of the precursor material is preferably performed under an inert gas atmosphere or in a vacuum from the viewpoint of preventing oxidation.

In the present invention, the precursor material in a molten state is quenched. The quenching method is ordinarily a method for contacting a refrigerant with the precursor material in a molten state. 'Contacting' signifies the case in which a refrigerant contacts directly with the precursor material in a molten state, and the case in which a refrigerant contacts indirectly with the precursor material in a molten state via a reaction vessel. The temperature of a refrigerant is not particularly limited but is, for example, 30° C. or less, and may be 15° C. or less, or 0° C. or less. The refrigerant may be liquid, solid or gas. Specific examples of the refrigerant include water, ice, metal and air. Examples of the quenching method include a water cooling method, an air cooling method and a single-roll method.

The cooling rate in quenching is preferably 1 K/second or more for example, more preferably 10 K/second or more, and further more preferably $10^2$ K/second or more. Also, the quenching in the present invention is preferably a treatment of cooling until the temperature of the sulfide solid electrolyte material becomes 100° C. or less, and more preferably a treatment of cooling until the temperature of the sulfide solid electrolyte material becomes 50° C. or less. Also, the sulfide solid electrolyte material to be obtained by the present invention is the same as the contents described in 'A. Sulfide solid electrolyte material' above; therefore, the description herein is omitted.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Lithium sulfide ($Li_2S$), phosphorus pentasuifide ($P_2S_5$) and silicon dioxide ($SiO_2$) were used as starting materials. These powders were mixed in a glove box under an argon atmosphere at a ratio of 1.2703 g of $Li_2S$, 1.3699 g of $P_2S_5$ and 0.3597 g of $SiO_2$ to obtain a raw material composition. Next, the obtained raw material composition was ground for 90 minutes by using vibrating mill (manufactured by Cosmic Mechanical Technology Co., Ltd.)

The obtained precursor material was put in a carbon-coated quartz tube (a carbon crucible) and vacuum-sealed. The pressure of the quartz tube vacuum-sealed was approximately 30 Pa. Next, the quartz tube was placed in a burning furnace, heated from room temperature to 1000° C. taking 2.5 hours, maintained at 1000° C. for 5 hours, and then projected into chilled water and thereby quenched. Thus, a sulfide solid electrolyte material having a composition of $Li_{3.14}Si_{0.34}P_{0.70}S_{3.32}O_{0.68}$ was obtained. Incidentally, the composition in Example 1 corresponds to a composition in which x=0.70, y=0.04, and z=0 in $Li_{(4-x-4y)}Si_{(1-x+y)}P_{(x)}S_{(4-2a-z)}O_{(2a+z)}$.

Figure 4:
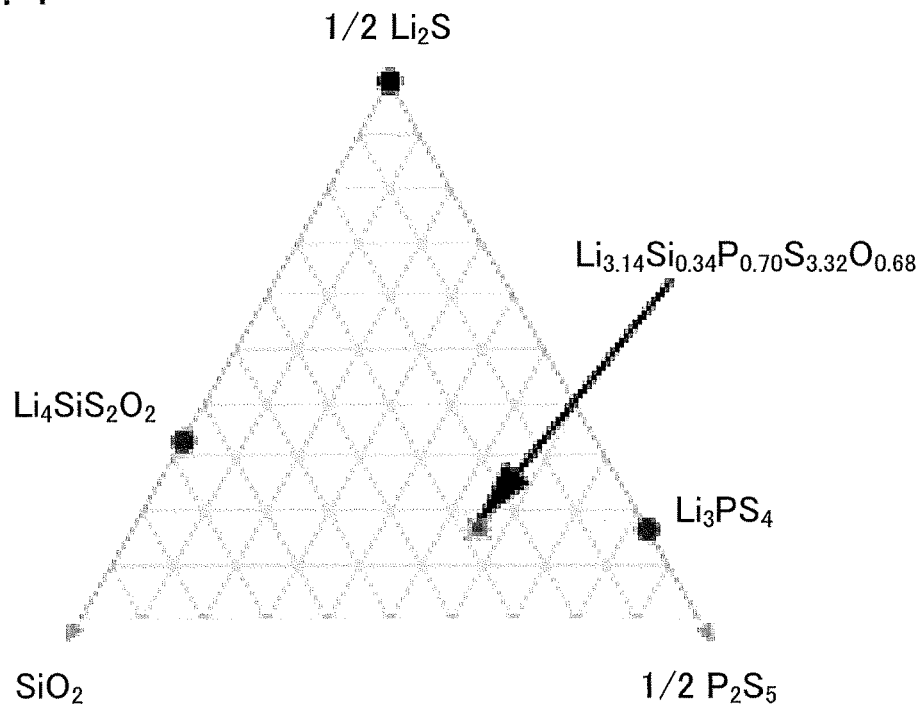
FIG. 4 is a ternary diagram showing a composition of a sulfide solid electrolyte material obtained in Example 1.
Figure 5:
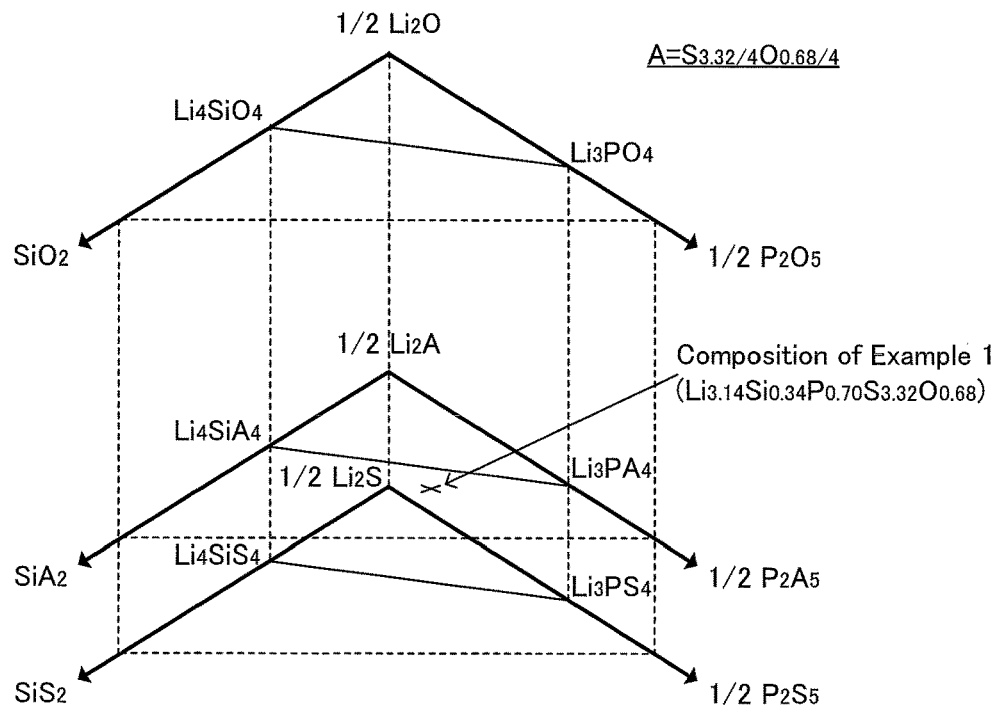
FIG. 5 is a quaternary diagram showing a composition of a sulfide solid electrolyte material obtained in Example 1.

Also, the composition of Example 1 may be represented as in FIG. 4 by showing a ternary view of $Li_2S$, $P_2S_5$ and $SiO_2$ which are starting materials. Also, in the case of defining $A=S_{3.32/4}O_{0.68/4}$, the composition of Example 1 does not correspond to a composition on a tie line of $Li_4SiA_4$ and $Li_3PA_4$. Here, as shown in FIG. 5, when a ternary view in the case which an anion component is only the O element is shown on the upper side of FIG. 5 and a ternary view in the case which an anion component is only the S element is shown on the lower side of FIG. 5, the composition of Example 1 such that an anion component is the O element and the S element may be shown between both of the cases. Also, in FIG. 5, $Li_4SiO_4$, $Li_4SiA_4$ and $Li_4SiS_4$ correspond to the so-called Si-based ortho-composition, and $Li_3PO_4$, $Li_3PA_4$ and $Li_3PS_4$ correspond to the so-called P-based ortho-composition. The composition of Example 1 is a new composition which does not correspond to a composition on a tie line of $Li_4SiA_4$ and $Li_3PA_4$.

Comparative Examples 1 to 3

A sulfide solid electrolyte material of Comparative Examples 1 to 3 was obtained by using the same method as the method described in Example 1 of Patent Literature 1 (JP-A 2013-177288) The composition of Comparative Example 1 was $Li_{3.35}Ge_{0.35}P_{0.65}S_4$, the composition of Comparative Example 2 was $Li_{3.27}Sn_{0.27}P_{0.73}S_4$ and the composition of Comparative Example 3 was Li$_{3.55}$Si$_{0.45}$P$_{0.55}$S$_4$. Incidentally, the composition of Comparative Example 3 corresponds to a composition on a tie line of Li$_4$SiS$_4$ and Li$_3$PS$_4$ in FIG. 5. Also, as not shown in figures, but the composition of Comparative Example 1 corresponds to a composition on a tie line of Li$_4$GeS$_4$ and Li$_3$PS$_4$, and the composition of Comparative Example 2 corresponds to a composition on a tie line of Li$_4$SnS$_4$ and Li$_3$PS$_4$.

Comparative Examples 4 to 6

A sulfide solid electrolyte material of Comparative Examples 4 to 6 was obtained by using the same method as the method described in Example 1 of Patent Literature 1 (JP-A 2013-177288). The composition of Comparative Example 4 was Li$_{10.35}$Si$_{1.35}$P$_{1.65}$S$_{12}$ (Li$_{3.45}$Si$_{0.45}$P$_{0.55}$S$_4$), the composition of Comparative Example 5 was Li$_{10}$GeP$_2$S$_{12}$ (Li$_{3.33}$Ge$_{0.33}$P$_{0.67}$S$_3$), and the composition of Comparative Example 6 was Li$_{9.81}$Sn$_{0.81}$P$_{2.19}$S$_{12}$ (Li$_{3.27}$Sn$_{0.27}$P$_{0.73}$S$_4$).

[Evaluations]
[X-Ray Diffraction Measurement]

Figure 6:
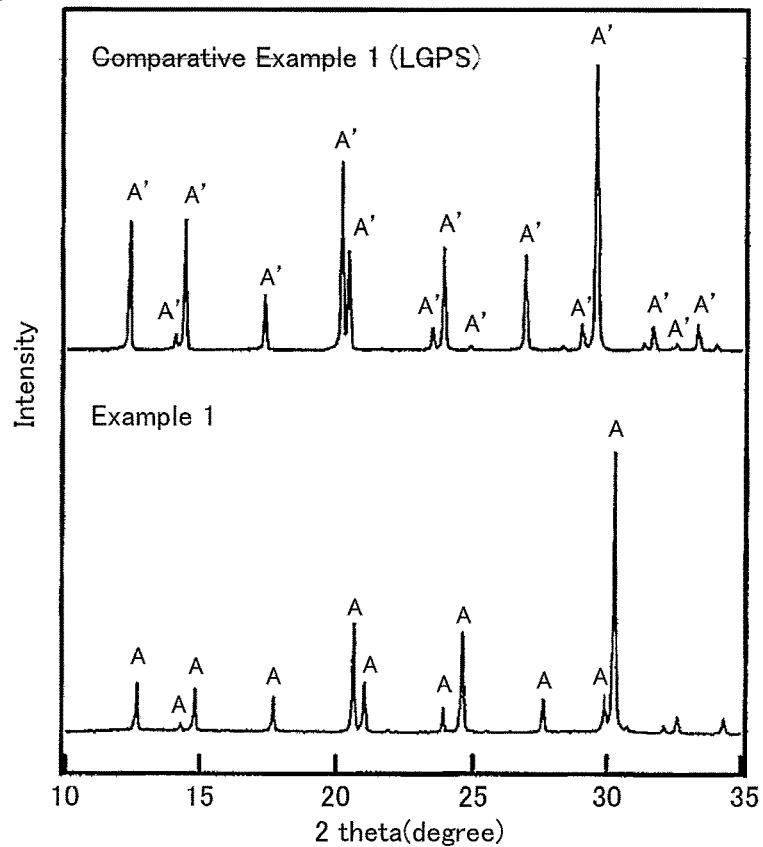
FIG. 6 is a result of XRD measurement for a sulfide solid electrolyte material obtained in Example 1 and Comparative Example 1.

X-ray diffraction (XRD) measurement was performed for the sulfide solid electrolyte material obtained in Example 1 and Comparative Example 1. XRD measurement was performed for a powder sample on the conditions under an inert atmosphere and using a CuKα ray. The results are shown in FIG. 6. As shown in FIG. 6, in Example 1, peaks appeared at positions of 2θ=12.66°, 14.28°, 14.81°, 17.74°, 20.64°, 21.03°, 23.96°, 24.63°, 27.66°, 29.91° and 30.26°. These peaks are the peaks of the crystal phase A with high Li ion conductivity. Also, in Example 1, the crystal phase A was obtained as approximately a single phase and the peak of the crystal phase B with low Li ion conductivity was not confirmed. On the other hand, in Comparative Example 1, the peak of the crystal phase A' approximately equal to the crystal phase A was obtained. Specifically, the crystal phase A' has peaks at positions of 2θ=12.36°, 14.05°, 14.40°, 17.38°, 20.18°, 20.44°, 23.56°, 23.96°, 24.93°, 26.96°, 29.07°, 29.58°, 31.71°, 32.66° and 33.39°.

Figure 7:
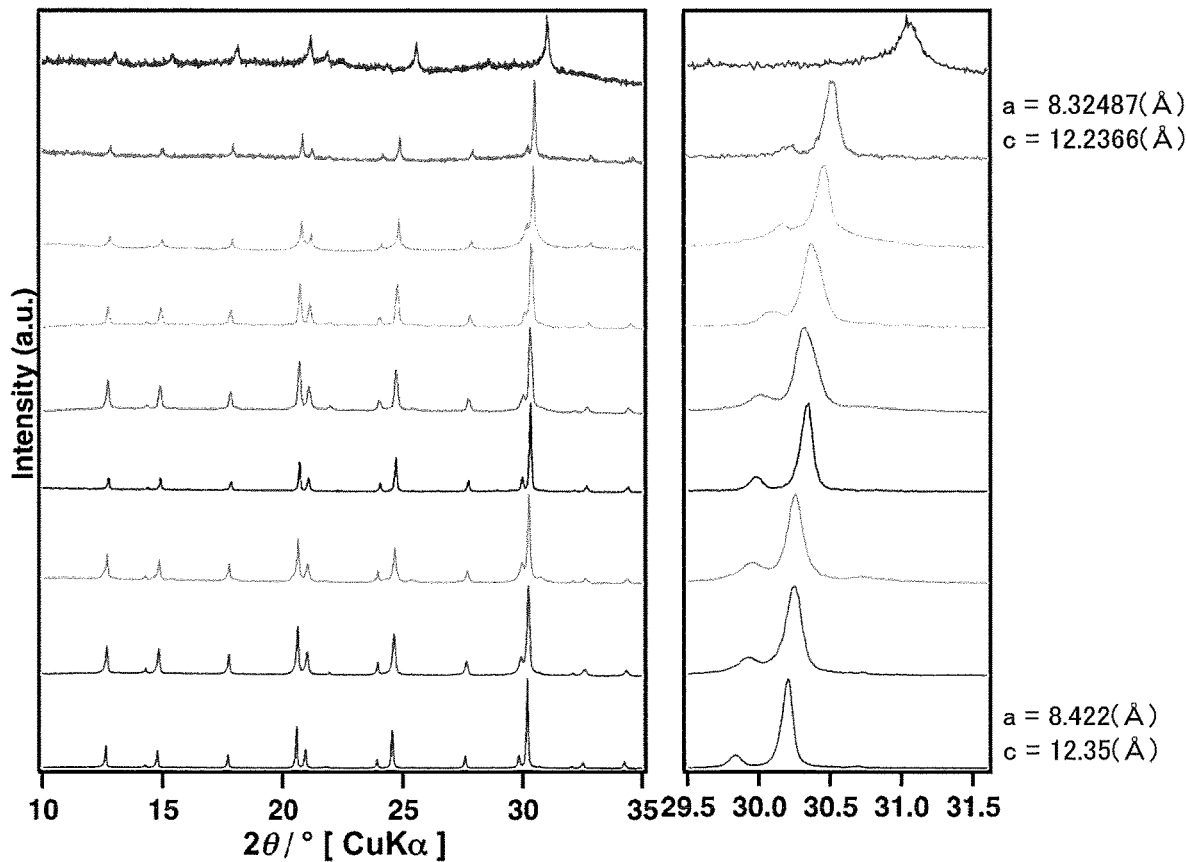
FIG. 7 is a result of XRD measurement for a sulfide solid electrolyte material obtained in Example 1.

Also, FIG. 7 is the result of XRD measurement for the sulfide solid electrolyte material obtained in Example 1. As shown on the left side of FIG. 7, it was confirmed that the sulfide solid electrolyte material obtained in Example 1 was synthesized with favorable reproducibility even though the experiments were conducted plural times. On the other hand, as shown on the right side of FIG. 7, it was confirmed that the lattice constant "a" changed to 8.32487 (Å) to 8,422 (Å) (a change of 0.09713 (Å) by confirming the peak position in the vicinity of 2θ=30° in detail.

Figure 8:
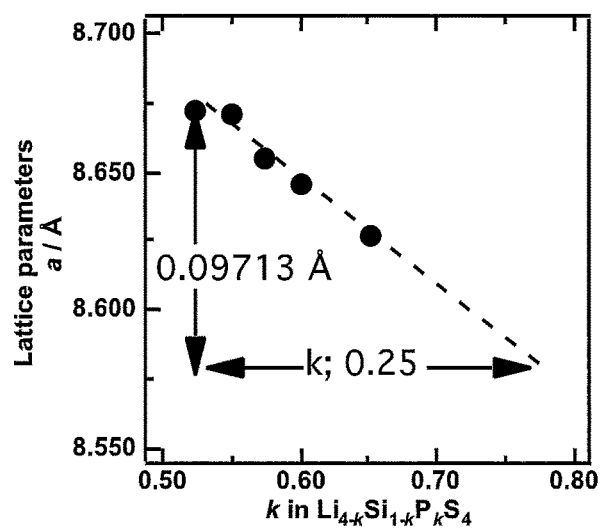
FIG. 8 is a graph showing a relation of a ratio between Si and P and a lattice constant.

Here, it is assumed that the change of the lattice constant "a" is caused by a change of the ratio between Si and P. In the case the ratio between Si and P is regarded as Si:P=1-k:k, the change of 0.09713 (Å) corresponds to a change of "k" by 0.25 as shown in FIG. 8 on the basis of the result of the prior studies (Hori, S. Suzuki K., Hirayama, M., Kato, Y., Saito, T., Yonemura, M. & Kanno, R. (2014). Faraday Discuss. 176, 83-94). This change corresponds to −0.13≤x≤0.13 in Li$_{(3.14-x)}$Si$_{(0.34-x)}$P$_{(0.70+x)}$S$_{(3.32-z)}$O$_{(0.68+z)}$.

Figure 9A:
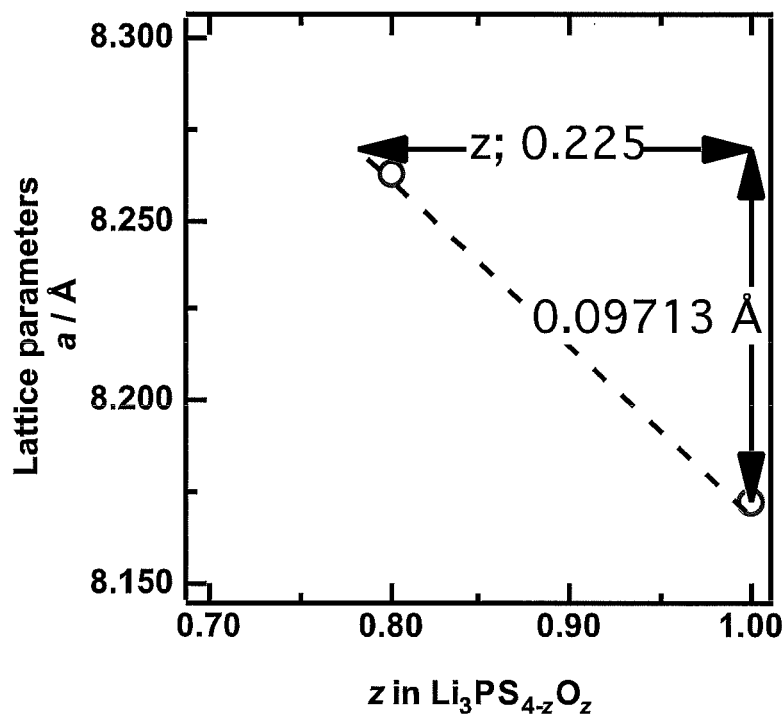
FIGS. 9A and 9B are graphs showing a relation of a ratio between S and O and a lattice constant.
Figure 9B:
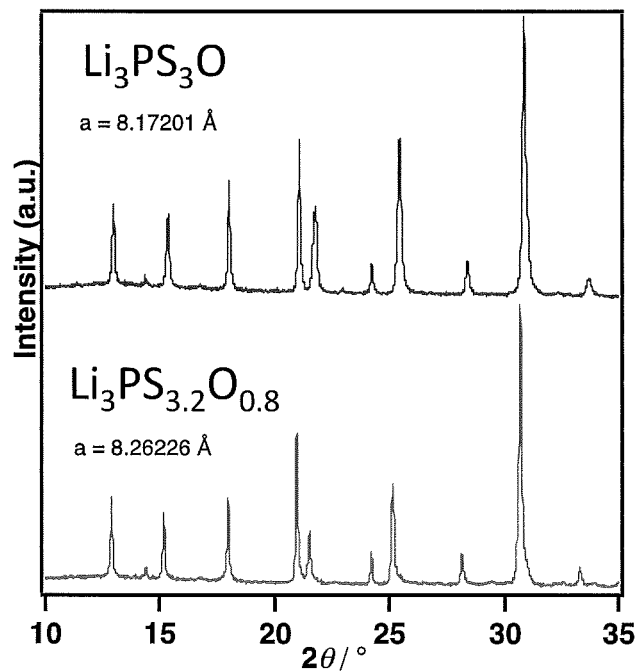

On the other hand, it is assumed that the change of the lattice constant "a" is caused by a change of the ratio between S and O. In the case the ratio between S and O is regarded as S:O=4−:z, the change of 0.09713 (Å) corresponds to a change "z" by 0.225 as shown in FIG. 9A on the basis of the result of the prior studies (Takada, K., Osada, M. Ohta, N., Inada, T., Kajiyama, A., Sasaki, H., Kondo, S., Watanabe, M. Sasaki, T, (2005). Solid State Ionics 176, 2355-2359. and Mori, Satoshi, Suzuki, Kouta, Hirayama, Masaaka, Kanno, Ryoji, Powder Metallurgy Association H27 Spring Lecture Meeting (Tokyo) 2-39A). This change corresponds to −0.11≤z≤0.11 in Li$_{(3.14-x)}$Si$_{(0.34-x)}$P$_{(0.70+x)}$S$_{(3.32-z)}$O$_{(0.68+z)}$. Incidentally, as shown in FIG. 9B, the lattice constant "a" of Li$_3$PS$_3$O is 8.17201 (Å) and the lattice constant "a" of Li$_3$PS$_{3.2}$O$_{0.8}$ is 8.26226 (Å). From the result in Example 1 and considerations of the above, it was confirmed that the desired effect was obtained in Li$_{(3.14-x)}$Si$_{(0.34-x)}$P$_{(0.70-x)}$S$_{(3.32-z)}$O$_{(0.68+z)}$ (−0.13≤x≤0.13, −0.11≤z≤0.11).

[Cyclic Voltammetry Measurement]

Figure 10:
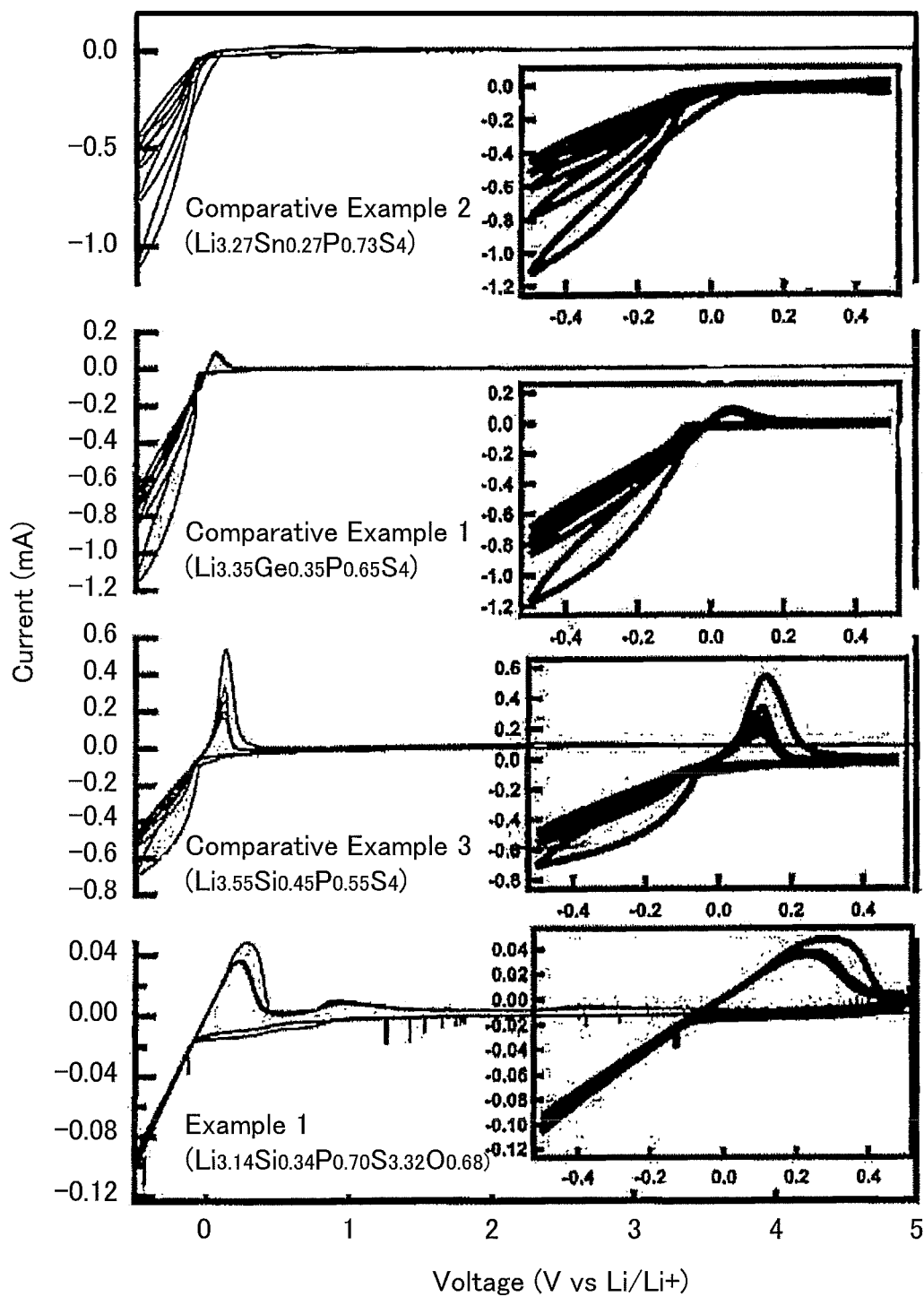
FIG. 10 is a result of CV measurement for a sulfide solid electrolyte material obtained in Example 1 and Comparative Examples 1 to 3.

Cyclic voltammetry (CV) measurement was performed by using the sulfide solid electrolyte material obtained in Example 1 and Comparative Examples 1 to 3. Specifically, a sample (thickness: 1 mm), in which SUS, the sulfide solid electrolyte material and Li were laminated, was produced and measured at a sweep rate of 1 V/sec. The results are shown in FIG. 10. As shown in FIG. 10, in Comparative Example 1 (Ge-based) and Comparative Example 2 (Sn-based), a peak in the vicinity of +0 V (a peak corresponding to dissolution of Li) is scarcely confirmed. Also, it is conceived that electric current in the reduction direction in the vicinity of −0 V does not correspond to Li segregation but to decomposition of the sulfide solid electrolyte material.

On the contrary, in Comparative Example 3 (Si-based) and Example 1 (Si—O-based), a peak corresponding to Li dissolution was clearly confirmed in the vicinity of +0 V. Also, in Comparative Example 3 (Si-based), a current value corresponding to Li segregation in the vicinity of −0 Vdecreased as the cycle proceeded. The reason therefor is conceived to be that a reductive decomposition reaction of the sulfide solid electrolyte material was caused at the interface between the sulfide solid electrolyte material and Li, and a resistive layer was formed as the cycle proceeded. On the other hand, in Example 1 (Si—O-based), even though the cycle proceeded, the decreasing rate of a current value corresponding to Li segregation in the vicinity of −0 V was small. Thus, it was suggested that a stable interface was formed between the sulfide solid electrolyte material and Li.

[Charge and Discharge Test)

An evaluation battery was produced by using the sulfide solid electrolyte material obtained in Example 1 and Comparative Examples 1 to 3. A mixture of LiCoO$_2$ and the sulfide solid electrolyte material obtained in Comparative Example 1 was used for a cathode active material layer, the sulfide solid electrolyte material obtained in Comparative Examples 1 to 3 was used for a solid electrolyte layer, and a Li foil was used for an anode active material layer. A charge and discharge test was performed between 2.5 V to 4.2 V at a constant current of 0.0636 mA/cm$^2$. The results of initial discharge capacity and coulomb efficiency are shown in FIG. 11.

Figure 11:
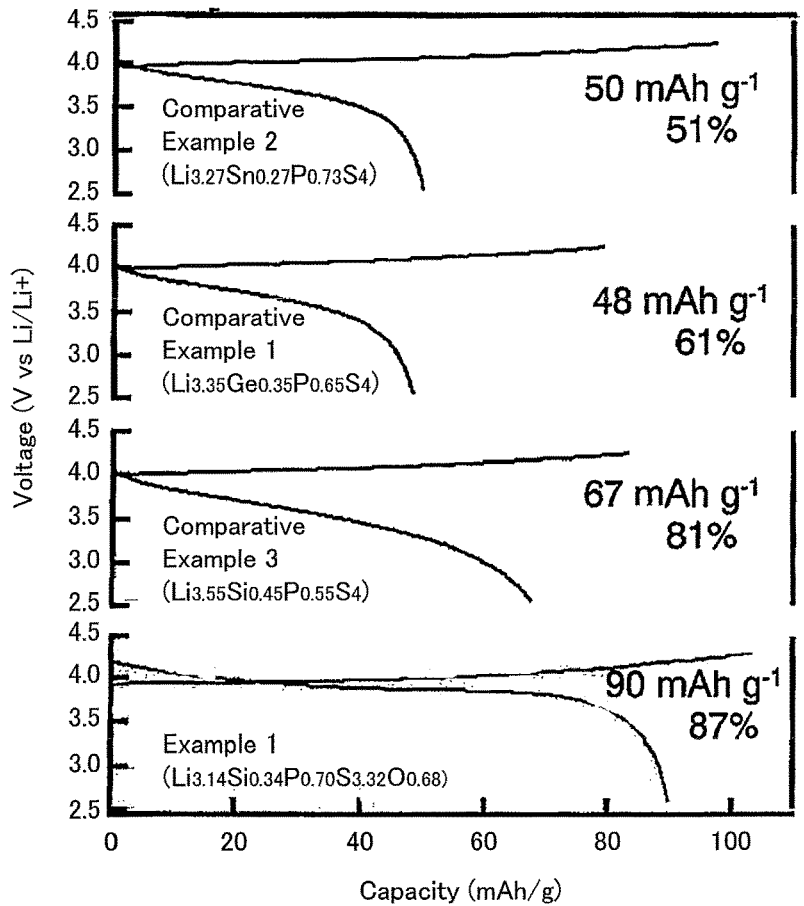
FIG. 11 is a result of a charge and discharge test for an evaluation battery using a sulfide solid electrolyte material obtained in Example 1 and Comparative Examples 1 to 3.

As shown in FIG. 11, in Example 1, the initial discharge capacity was 90 mAh/g and the coulomb efficiency was 87%, and both values were higher than the values in Comparative Examples 1 to 3. In Comparative Examples 1 to 3, the molar ratio between tetravalent and pentavalent cations and anions is 1:4; in Example 1, the molar ratio between tetravalent and pentavalent cations (Si and P) and anions (S and O) is 1.04:4. It was suggested that a difference in the molar ratio between cations and anions also possibly contributed to the improvement of the initial discharge capacity and the coulomb efficiency.

Figure 12A:
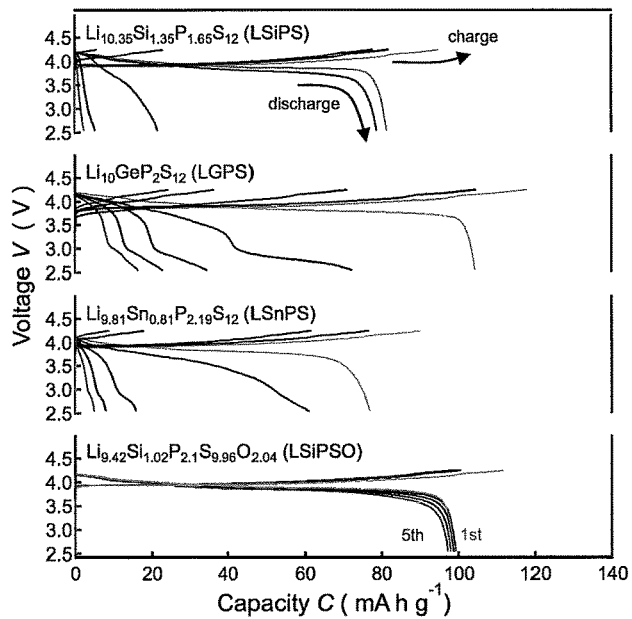
Figure 12B:
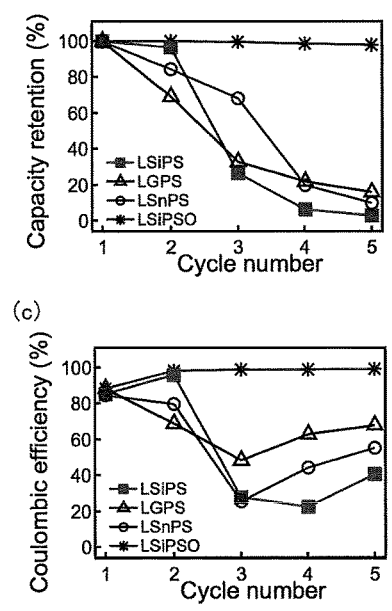

Also, an evaluation battery was produced by using the sulfide solid electrolyte material obtained in Example 1 and Comparative Examples 4 to 6. For a cathode active material layer, LiCoO$_2$ coated with LiNbO$_3$ and the mixture of the sulfide solid electrolyte material obtained in Comparative Example 5 was used, the sulfide solid electrolyte material obtained in Example 1 and Comparative Examples 4 to 6 was used for a solid electrolyte layer, and a Li foil was used for an anode active material layer. A charge and discharge test was performed between 2.55 V to 4.25 V at a constant current of 0.015 mA/cm$^2$ to 0.019 mA/cm$^2$. The current value for the each evaluation battery was unified to have C rate of approximately 1/20 C. The result is shown in FIGS. 12A to 12C. As shown in FIG. 12A, more favorable capacity was obtained in Example 1 compared to that in Comparative Examples 4 to 6. Also, as shown in FIGS. 12B and 12C, Example 1 showed the value nearly 100% in both the capacity maintenance rate (FIG. 12B) and the cycle efficiency (FIG. 12C).

Examples 2-1 to 2-3, Comparative Examples 7-1 and 7-2

Figure 13:
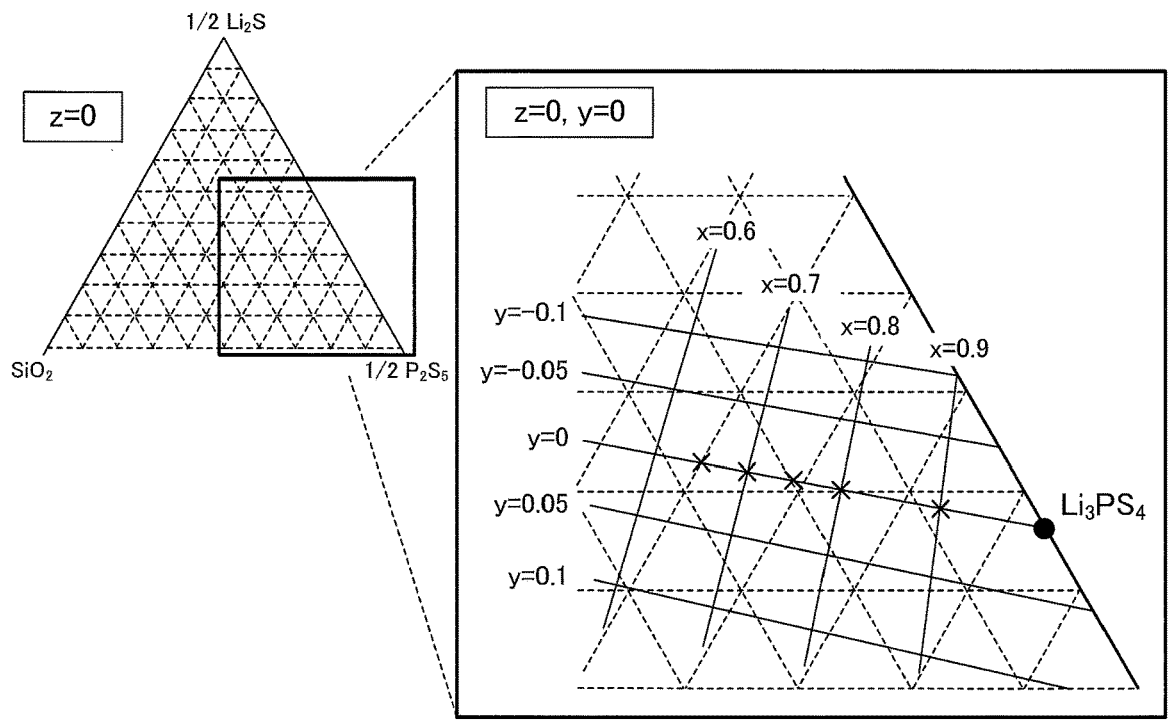
FIG. 13 is a ternary diagram explaining a sulfide solid electrolyte material obtained in Examples 2-1 to 2-3, and Comparative Examples 2-1 and 2-2.
Figure 14:
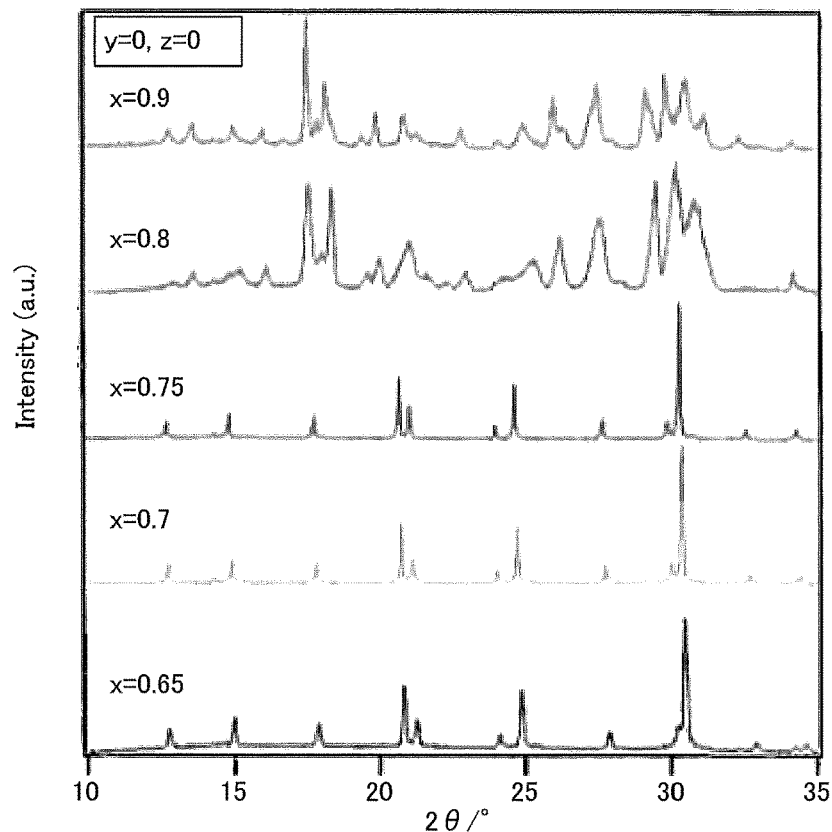
FIG. 14 is a result of XRD measurement for a sulfide solid electrolyte material obtained in Examples 2-1 to 2-3 and Comparative Examples 2-1 to 2-2.

A sulfide solid electrolyte material was obtained in the same manner as in Example 1, except that the proportion of the raw materials included in the raw material composition were changed so as to obtain the composition shown in Table 1. These composition correspond to the composition when y=0 and z=0 are fixed and x is variable in the ternary system shown in FIG. 13. X-ray diffraction (XRD) Measurement was performed for the obtained sulfide solid electrolyte material. The method for the measurement was the same as described above. The result is shown in FIG. 14. As shown in FIG. 14, in Examples 2-1 to 2-3 (x=0.65, 0.7, and 0.75), the crystal phase A with high Li ion conductivity was obtained in almost a single phase, similarly to Example 1. On the other hand, in Comparative Examples 7-1 and 7-2 (x=0.8, and 0.9) the crystal phase A was not obtained at least as the main phase. From these results, it was confirmed that the crystal phase A was obtained in the range of 0.65≤x≤0.75.

Examples 3-1 to 3-6

Figure 15:
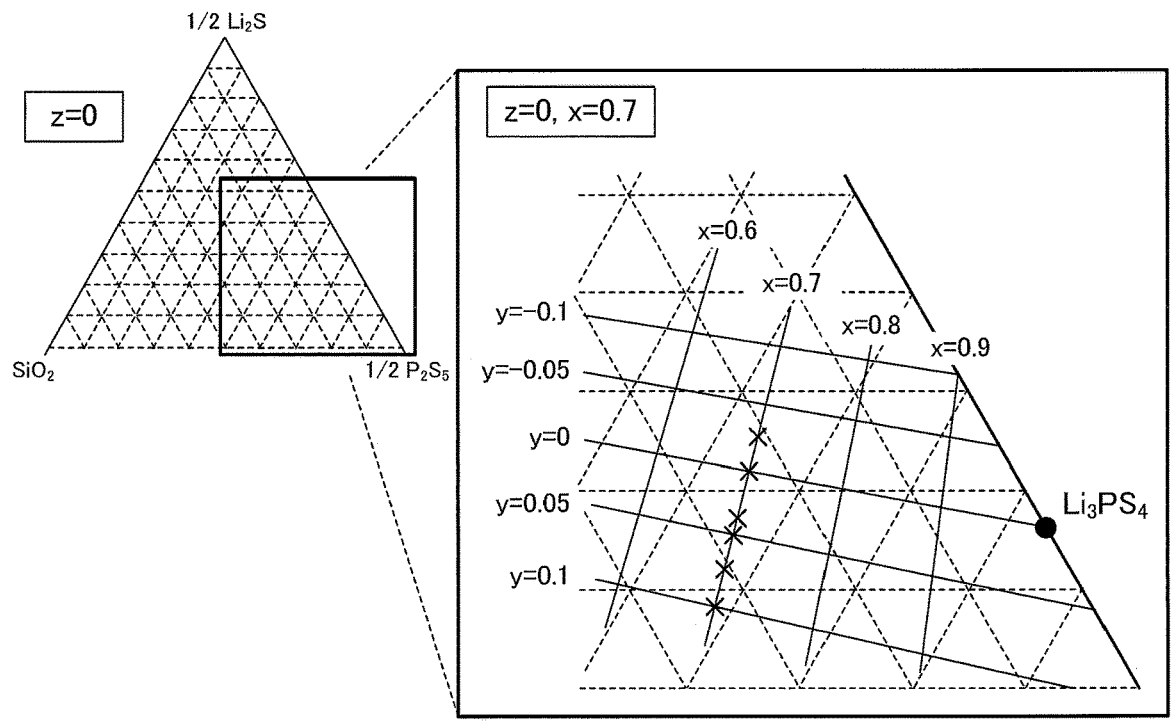
FIG. 15 is a ternary diagram explaining a sulfide solid electrolyte material obtained in Examples 3-1 to 3-6.
Figure 16:
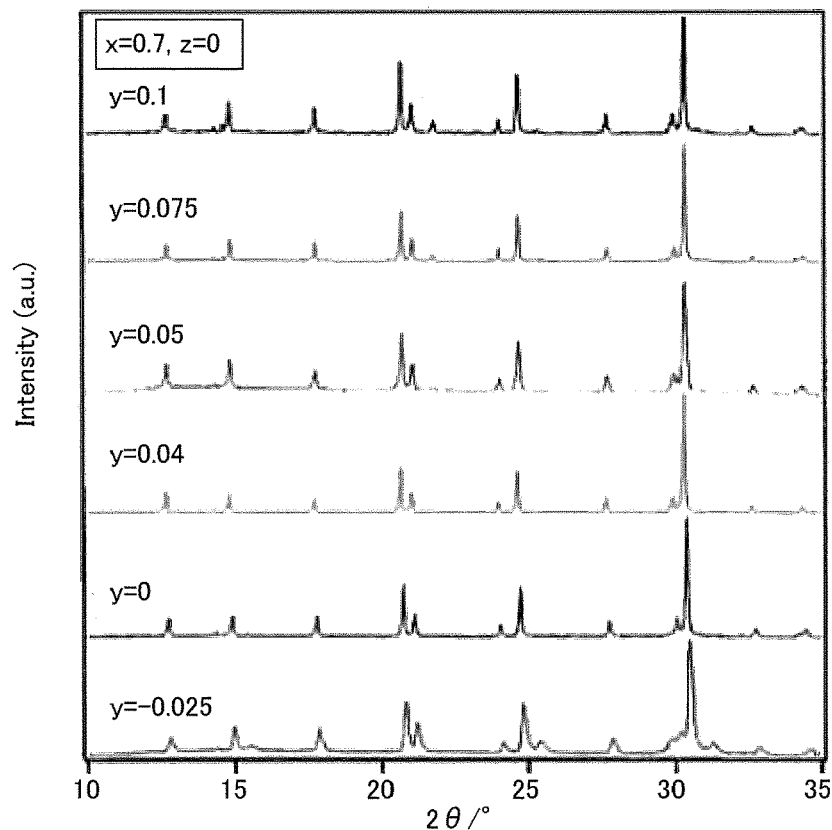
FIG. 16 is a result of XRD measurement for a sulfide solid electrolyte material obtained in Examples 3-1 to 3-6.

A sulfide solid electrolyte material was obtained in the same manner as in Example 1, except that the proportion of the raw materials included in the raw material composition were changed so as to obtain the composition shown in Table 1. These compositions correspond to the composition when x=0.7 and z=0 are fixed and y is variable in the ternary system shown in FIG. 15. Incidentally, Example 3-3 is the same composition as in Example 1. X-ray diffraction (XRD) measurement was performed for the obtained sulfide solid electrolyte material. The method for the measurement was the same as described above. The result is shown in FIG. 16. As shown in FIG. 16, Examples 3-1 to 6 (y=−0.025 to 0.1), the crystal phase A with high Li ion conductivity was obtained in almost a single phase, similarly to Example 1. From these results, it was confirmed that the crystal phase A was obtained in the range of −0.025≤y≤0.1.

Examples 4-1, 4-2 and Comparative Examples 8-1 to 8-3

Figure 17:
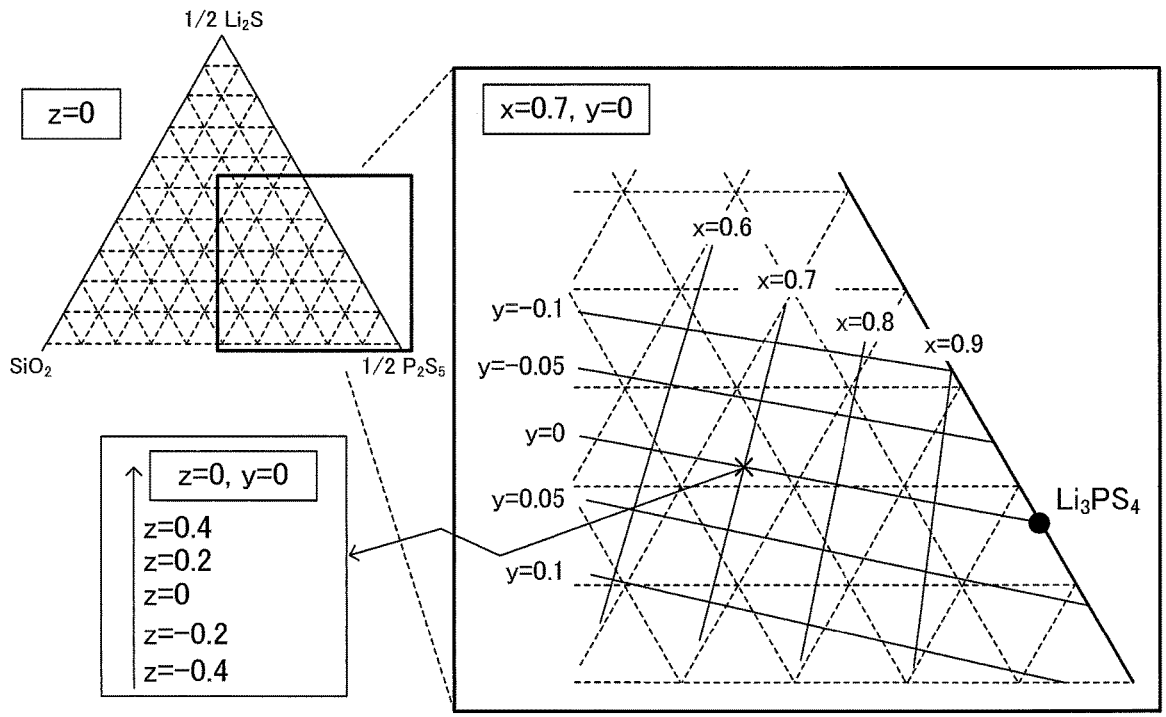
FIG. 17 is a ternary diagram explaining a sulfide solid electrolyte material obtained in Examples 4-1, 4-2, and Comparative Examples 4-1 to 4-3.
Figure 18:
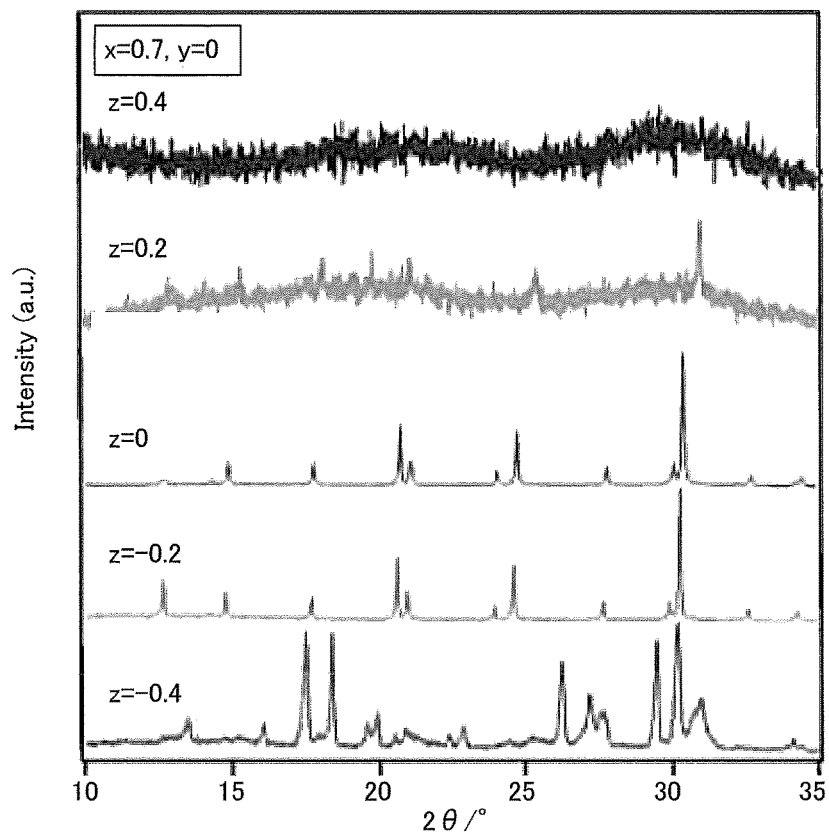
FIG. 18 is a result of XRD measurement for a sulfide solid electrolyte material obtained in Examples 4-1, 4-2 and Comparative Examples 4-1 to 4-3.
Figure 19A:
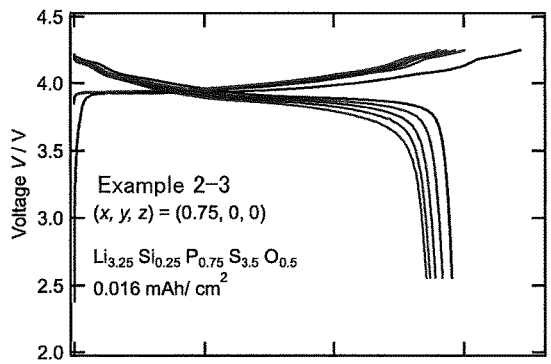
FIGS. 19A to 19F are results of charge and discharge tests for evaluation batteries using a sulfide solid electrolyte material obtained in Example 2-3, Example 3-5, Example 3-6, Example 4-2, Example 5-1, and Example 5-2.
Figure 19B:
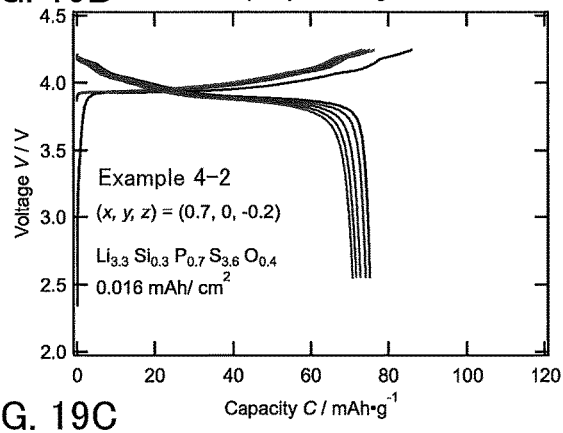
Figure 19C:
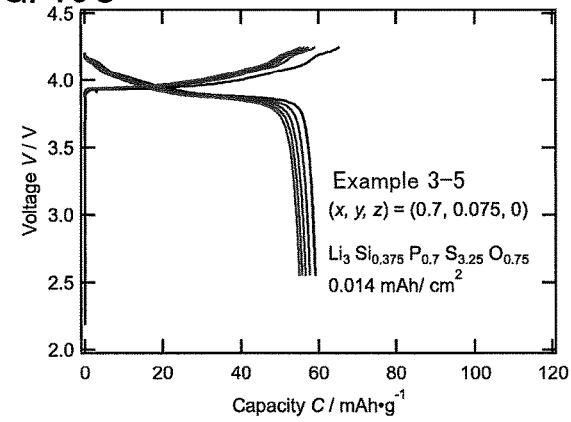
Figure 19D:
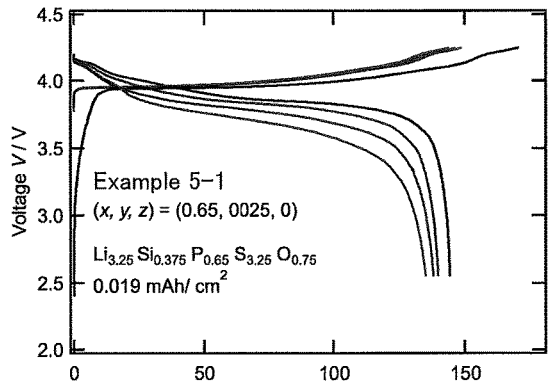
Figure 19E:
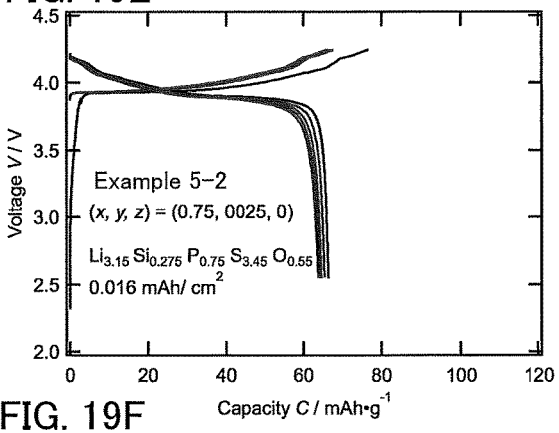
Figure 19F:
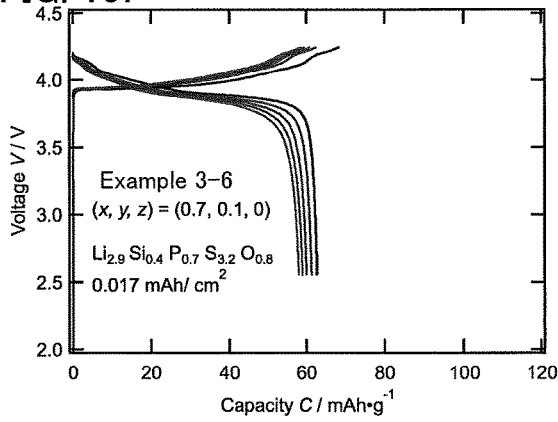

A sulfide solid electrolyte material was obtained in the same manner as in Example 1, except that the proportion of the raw materials included in the raw material composition were changed so as to obtain the composition shown in Table 1. These compositions correspond to the composition when x=0.7 and y=0 are fixed and z is variable (when variable in the direction not illustrated) in the ternary system shown in FIG. 17. X-ray diffraction (XRD) measurement was performed for the obtained sulfide solid electrolyte material. The method for the measurement was the same as described above. The result is shown in FIG. 18. As shown in FIG. 18, in Examples 4-1 and 4-2 (z=−0.2 to 0), the crystal phase A with high Li ion conductivity was obtained in almost a single phase, similarly to Example 1. On the other hand, in Comparative Examples 8-1 to 8-3 (x=0.4, 0.2, and −0.4), the crystal phase A was not obtained at least as the main phase. From these results, it was confirmed that the crystal phase A was obtained in the range of −0.2≤z≤0.

Examples 5-1 and 5-2

A sulfide solid electrolyte material was obtained in the same manner as in Example 1, except that the proportion of the raw materials included in the raw material composition were changed so as to obtain the composition shown in Table 1. The composition in Example 5-1 corresponds to the composition of x=0.65, y=0.025, and z=0 in Li$_{(4-x-4y)}$Si$_{(1-x+y)}$P$_{(x)}$S$_{(4-2a-z)}$O$_{(2a+z)}$. The composition in Example 5-2 corresponds to the composition of x−0.75, y=0.025, and z=0 in Li$_{(4-x-4y)}$Si$_{(1-x+y)}$P$_{(x)}$S$_{(4-2a-z)}$O$_{(2a+z)}$.

TABLE 1

| | Li$_{(4-x-4y)}$Si$_{(1-x+y)}$P$_{(x)}$S$_{(4-2a-z)}$O$_{(2a+z)}$ a = 1 − x + y | | | Specific composition | | | | |
|---|---|---|---|---|---|---|---|---|
| | x | y | z | Li | Si | P | S | O |
| Example 2-1 | 0.65 | 0 | 0 | 3.35 | 0.35 | 0.65 | 3.3 | 0.7 |
| Example 2-2 | 0.7 | 0 | 0 | 3.3 | 0.3 | 0.7 | 3.4 | 0.6 |
| Example 2-3 | 0.75 | 0 | 0 | 3.25 | 0.25 | 0.75 | 3.5 | 0.5 |
| Comp. Example 7-1 | 0.8 | 0 | 0 | 3.2 | 0.2 | 0.8 | 3.6 | 0.4 |
| Comp. Example 7-2 | 0.9 | 0 | 0 | 3.1 | 0.1 | 0.9 | 3.8 | 0.2 |
| Example 3-1 | 0.7 | −0.025 | 0 | 3.4 | 0.275 | 0.7 | 3.45 | 0.55 |
| Example 3-2 | 0.7 | 0 | 0 | 3.3 | 0.3 | 0.7 | 3.4 | 0.6 |
| Example 3-3 | 0.7 | 0.04 | 0 | 3.14 | 0.34 | 0.7 | 3.32 | 0.68 |
| Example 3-4 | 0.7 | 0.05 | 0 | 3.1 | 0.35 | 0.7 | 3.3 | 0.7 |
| Example 3-5 | 0.7 | 0.075 | 0 | 3 | 0.375 | 0.7 | 3.25 | 0.75 |
| Example 3-6 | 0.7 | 0.1 | 0 | 2.9 | 0.4 | 0.7 | 3.2 | 0.8 |
| Comp. Example 8-1 | 0.7 | 0 | 0.4 | 3.3 | 0.3 | 0.7 | 3 | 1 |
| Comp. Example 8-2 | 0.7 | 0 | 0.2 | 3.3 | 0.3 | 0.7 | 3.2 | 0.8 |
| Example 4-1 | 0.7 | 0 | 0 | 3.3 | 0.3 | 0.7 | 3.4 | 0.6 |
| Example 4-2 | 0.7 | 0 | −0.2 | 3.3 | 0.3 | 0.7 | 3.6 | 0.4 |

TABLE 1-continued

| | $Li_{(4-x-4y)}Si_{(1-x+y)}P_{(x)}S_{(4-2a-z)}O_{(2a+z)}$ $a = 1 - x + y$ | | | Specific composition | | | | |
|---|---|---|---|---|---|---|---|---|
| | x | y | z | Li | Si | P | S | O |
| Comp. Example 8-3 | 0.7 | 0 | −0.4 | 3.3 | 0.3 | 0.7 | 3.8 | 0.2 |
| Example 5-1 | 0.65 | 0.025 | 0 | 3.25 | 0.375 | 0.65 | 3.25 | 0.75 |
| Example 5-2 | 0.75 | 0.025 | 0 | 3.15 | 0.275 | 0.75 | 3.45 | 0.55 |

As shown in FIG. 14, FIG. 16, and FIG. 18, in each Example, the similar XRD diagram was obtained and the similar lattice constant was obtained. Accordingly, it was confirmed that these sulfide solid electrolyte materials had the crystal phase A with high Li ion conductivity, and included a Si element and an O element in the crystal structure. Meanwhile, in each Example, although the composition differs from each other, the similar XRD diagram was obtained. Presumable reasons therefor may be both of (A) possibility that the solid solution in which the ratio of Si/P or the ratio of S/O in the crystal structure was obtained, and (B) possibility that extremely small quantity of impurity was generated, or either one of (A) and (B). From the viewpoint of solid state chemistry, as long as the range of the change in the composition and in the XRD diagram is the range shown in each Example, the reduction resistance is presumably not degraded due to (A) and (B).

In fact, an evaluation battery was produced by using some of the sulfide solid electrolyte materials obtained in Example for the solid electrolyte layer. In particular, LiCoO$_2$ was used for the cathode active material layer, the sulfide solid electrolyte material obtained in Example was used for the solid electrolyte layer, and a Li foil was used for the anode active material layer. The result is shown in FIGS. 19A to 19F, shown in FIGS. 19A to 19F, in each Example, favorable reduction resistance was shown. In this manner, it was confirmed that the reduction resistance was not degraded due to (A) and (B).

REFERENCE SIGNS LIST 1 cathode active material layer
2 anode active material layer
3 electrolyte layer
4 cathode current collector
5 anode current collector
6 battery case
10 battery

The invention claimed is:

1. A sulfide solid electrolyte material having a peak at a position of 2θ=14.81°±1.00° and a peak at a position of 2θ=30.26°±1.00° in X-ray diffraction measurement using a CuKα ray, and having a composition of $Li_{(4-x-4y)}Si_{(1-x+y)}P_{(x)}S_{(4-2a-z)}O_{(2a+z)}$, wherein a=1−x+y, 0.65≤x≤0.75, −0.025≤y≤0.1, −0.2≤z≤0.

2. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 1.

3. A producing method for the sulfide solid electrolyte material according to claim 1, the producing method comprising steps of:
a mechanical milling step of obtaining a precursor material by performing mechanical milling for a raw material composition containing a constituent of the sulfide solid electrolyte material; and
a melting and quenching step of melting by heating and quenching the precursor material to obtain the sulfide solid electrolyte material.

4. The producing method for the sulfide solid electrolyte material according to claim 3, wherein a heating temperature in the melting and quenching step is within a range of 800° C. to 1100° C.

5. The sulfide solid electrolyte material according to claim 1 wherein the position is 2θ=30.26°±0.50°.

6. A sulfide solid electrolyte material having a peak at a position of 2θ=14.81°±1.00° and a peak at a position of 2θ=30.26°±1.00° in X-ray diffraction measurement using a CuKα ray, and having a composition of $Li_{(3.14-x)}Si_{(0.34-x)}P_{(0.70+x)}S_{(3.32-z)}O_{(0.68+z)}$, wherein −0.13≤x≤0.13, −0.11≤z≤0.11.

7. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 6.

8. A producing method for the sulfide solid electrolyte material according to claim 6, the producing method comprising steps of:
a mechanical milling step of obtaining a precursor material by performing mechanical milling for a raw material composition containing a constituent of the sulfide solid electrolyte material; and
a melting and quenching step of melting by heating and quenching the precursor material to obtain the sulfide solid electrolyte material.

9. The producing method for the sulfide solid electrolyte material according to claim 8, wherein a heating temperature in the melting and quenching step is within a range of 800° C. to 1100° C.

10. The sulfide solid electrolyte material according to claim 6 wherein the position is 2θ=30.26°±0.50°.

11. A sulfide solid electrolyte material having an octahedron O comprising a Li element and a S element, a tetrahedron T$_1$ comprising at least one element of a P element and a Si element, and a S element, and a tetrahedron T$_2$ comprising at least one element of a P element and a Si element, and a S element; the tetrahedron T$_1$ and the octahedron O sharing an edge, and the tetrahedron T$_2$ and the octahedron O containing a crystal structure sharing a corner, wherein at least one of the octahedron O, the tetrahedron $T_1$ and the tetrahedron $T_2$ is such that part of the S element is substituted with an O element, and the sulfide solid electrolyte material has a composition of $Li_{(4-x-4y)}Si_{(1-x+y)}P_{(x)}S_{(4-2a-z)}O_{(2a+z)}$, wherein $a=1-x+y$, $0.65 \leq x \leq 0.75$, $-0.025 \leq y \leq 0.1$, $-0.2 \leq z \leq 0$.

12. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 11.

13. A producing method for the sulfide solid electrolyte material according to claim 11, the producing method comprising steps of:

a mechanical milling step of obtaining a precursor material by performing mechanical milling for a raw material composition containing a constituent of the sulfide solid electrolyte material; and a melting and quenching step of melting by heating and quenching the precursor material to obtain the sulfide solid electrolyte material.

14. The producing method for the sulfide solid electrolyte material according to claim 13, wherein a heating temperature in the melting and quenching step is within a range of 800° C. to 1100° C.

15. A sulfide solid electrolyte material having an octahedron O comprising a Li element and a S element, a tetrahedron $T_1$ comprising at least one element of a P element and a Si element, and a S element, and a tetrahedron $T_2$ comprising at least one element of a P element and a Si element, and a S element; the tetrahedron $T_1$ and the octahedron O sharing an edge, and the tetrahedron $T_2$ and the octahedron O containing a crystal structure sharing a corner, wherein at least one of the octahedron O, the tetrahedron $T_1$ and the tetrahedron $T_2$ is such that part of the S element is substituted with an O element, and the sulfide solid electrolyte material has a composition of $Li_{(3.14-x)}Si_{(0.34-x)}P_{(0.70+x)}S_{(3.32-z)}O_{(0.68+z)}$, wherein $-0.13 \leq x \leq 0.13$, $-0.11 \leq z \leq 0.11$.

16. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 15.

17. A producing method for the sulfide solid electrolyte material according to claim 15, the producing method comprising steps of:

a mechanical milling step of obtaining a precursor material by performing mechanical milling for a raw material composition containing a constituent of the sulfide solid electrolyte material; and a melting and quenching step of melting by heating and quenching the precursor material to obtain the sulfide solid electrolyte material.

18. The producing method for the sulfide solid electrolyte material according to claim 17, wherein a heating temperature in the melting and quenching step is within a range of 800° C. to 1100° C.

* * * * *